United States Patent
Chow et al.

(10) Patent No.: US 8,376,261 B2
(45) Date of Patent: Feb. 19, 2013

(54) LANDING GEAR

(75) Inventors: Leung Choi Chow, Bristol (GB); Christopher Neil Wood, Congleton (GB); Philip Campbell, Stockport (GB)

(73) Assignee: Airbus UK Limited, Bristol (GB)

( * ) Notice: Subject to any disclaimer, the term of this patent is extended or adjusted under 35 U.S.C. 154(b) by 991 days.

(21) Appl. No.: 12/255,039

(22) Filed: Oct. 21, 2008

(65) Prior Publication Data

US 2009/0078821 A1    Mar. 26, 2009

Related U.S. Application Data

(63) Continuation-in-part of application No. 10/533,376, filed as application No. PCT/GB03/04586 on Oct. 23, 2003, now Pat. No. 7,484,688.

(30) Foreign Application Priority Data

Nov. 1, 2002  (GB) .................................. 0225517.2
Oct. 26, 2007 (GB) .................................. 0720978.6

(51) Int. Cl.
   *B64C 1/40*     (2006.01)
(52) U.S. Cl. ........................................... 244/1 N
(58) Field of Classification Search .................. 244/1 N, 244/100 R, 100 D, 129.4, 130
   See application file for complete search history.

(56) References Cited

U.S. PATENT DOCUMENTS

| | | | |
|---|---|---|---|
| 2,176,461 A | 10/1939 | Larsen | |
| 2,180,462 A | 11/1939 | De Seversky | |
| 2,941,756 A | 6/1960 | Roberts | |
| 3,934,923 A | 1/1976 | Lissaman et al. | |
| 4,537,373 A | 8/1985 | Butts | |
| 6,619,587 B1 * | 9/2003 | Chow et al. | 244/100 R |
| 6,786,451 B2 | 9/2004 | Courtois et al. | |
| 7,484,688 B2 * | 2/2009 | Chow et al. | 244/100 R |

FOREIGN PATENT DOCUMENTS

| | | |
|---|---|---|
| EP | 1 067 045 A1 | 1/2001 |
| EP | 1 340 676 A1 | 9/2003 |
| GB | 579657 | 8/1944 |
| GB | 568331 | 3/1945 |
| GB | 603804 | 6/1948 |
| GB | 608883 | 9/1948 |
| GB | 958427 | 5/1964 |
| WO | WO 01/04003 A1 | 1/2001 |

OTHER PUBLICATIONS

Yong Li et al., "Noise Sources Control of an Aircraft Landing Gear," 13th AIAA/CEAS Aeroacoustics Conference, May 2004, 1 page.
Eric Bouty-Snecma, "Silence(R): Significantly Lower Community Exposure to Aircraft Noise," CALM Workshop—Brussels, Jun. 16, 2005, 20 pages.

(Continued)

*Primary Examiner* — Richard Price, Jr.
(74) *Attorney, Agent, or Firm* — Patterson, Thuente, Christensen, Pedersen, P.A.

(57) ABSTRACT

An aircraft landing gear is described including a noise-reducing means. In one embodiment there is a noise-reducing element that includes an air-deflecting surface, in the form of a fairing, and a perforated airflow-reducing region. In use, some air passes through the perforations, while other air is deflected by the fairing away from a noise-generating region of the landing gear. Noise caused by the passing of the landing gear through the air is therefore reduced. In another embodiment a noise-reducing layer in the form of a mesh is supported by a skeleton structure.

23 Claims, 13 Drawing Sheets

OTHER PUBLICATIONS

Werner Dobrzynski and partners from Airbus, Messier-Dowty, BAE-Systems and ISVR, "Low Noise Landing Gear Design—Summary of Efforts in European Projects and Future Needs," NASA Workshop, Jul. 23, 2007, 20 pages.

Eugène Kors, "Silence(R) Significantly Lower Community Exposure to Aircraft Noise," A/AA Aeroacoustic conference 2004, 35 pages.

* cited by examiner

LANDING GEAR

RELATED APPLICATIONS

The present application is a Continuation-in-Part of U.S. application Ser. No. 10/533,376 filed Apr. 29, 2005, which is a national phase entry of International Patent Application No. PCT/GB2003/004586, which was filed on Oct. 23, 2003 and which claims priority from United Kingdom Application Number 0225517.2, filed Nov. 1, 2002. The present application also claims priority from UK Patent Application No. 0720978.6 filed on Oct. 26, 2007. The disclosures of each of the aforementioned patent applications are hereby incorporated by reference herein in their entirety.

BACKGROUND OF THE INVENTION

The present invention relates to landing gear and to noise-reduction apparatus for use on an aircraft. More particularly, but not exclusively, the invention relates to landing gear designed to reduce the noise generated by the interaction of the landing gear and the air flowing past it during flight, take-off and/or landing. Such noise-reduction may be achieved by means of a noise reduction fairing.

It is desirous to minimise the noise generated by aircraft, for example, to lessen disruption or inconvenience, resulting from aircraft noise, caused to the public on the ground near airports. The interaction of the landing gear and the air flowing past it results in turbulent flows and consequently noise. A significant amount of noise is generated in this way.

SUMMARY OF THE INVENTION

It is an aim of the present invention to provide a landing gear that generates less noise compared to a landing gear of the same size that has not been adapted, designed or manufactured in accordance with the present invention. An additional, or alternative, aim of the present invention is to provide an improved noise reduction element for use on an aircraft landing gear.

According to one aspect of the invention there is provided an aircraft landing gear including a noise-reducing element that includes an air-deflecting surface and an airflow-reducing region through which, in use, air may pass, whereby the noise-reducing element is able in use to deflect air away from a noise-generating region of the landing gear, whilst allowing some air to pass through the element, thereby reducing the noise caused by the passing of the landing gear through the air.

Thus noise caused by the interaction of the air and the landing gear caused during the approach when landing may be reduced by means of providing a noise-reducing element according to the present invention. The provision of an airflow-reducing region enables the noise-reducing effect of the noise-reducing element to be improved. Exactly how the provision of such an airflow-reducing region reduces noise has not been fully analysed, although a possible explanation relating to the reduction of the production of turbulent airflows is provided below.

We have ascertained that certain parts of the landing gear contribute greatly to the noise generated by the landing gear as it passes through the air. Deflecting air away from these parts reduces noise generated by such parts, but can result in separate air flows being created that converge downstream of the landing gear. The converging air flows interact with each other, possibly resulting in turbulent air flows that generate extra noise. Also, the provision of an element that deflects air, may have a shape that results in eddy current(s) and further turbulence being created immediately upstream of the element. Providing an airflow-reducing region may, for example, divert a portion of the airflow that would otherwise contribute to such turbulent airflows. Allowing some air to flow, or bleed, through the element via the airflow-reducing region may therefore further reduce noise that might otherwise be generated, despite there being noise generated by the interaction of the element and the air flowing through the airflow-reducing region. Thus, the noise-reducing element may be configured to reduce, in use, the amount of turbulent airflow generated in the region of the landing gear.

An alternative or additional means by which the present invention might reduce noise may arise when the air deflected by the air-deflecting surface is caused to flow downstream onto or past other components of the landing gear or aircraft. In such a case, providing an airflow-reducing region may reduce the noise generated by the interaction of the high speed deflected airflows with such other downstream components, for example, by reducing the amount of air, or by reducing the speed of the air, flowing past or onto such other components.

The airflow-reducing region may, for example, therefore be considered as an airflow-bleeding region or even an airflow-bypass region in that some of (i.e. a portion and not all) the air that would otherwise be deflected by the noise-reducing element is allowed to flow through the element. The airflow-reducing region may be configured so that the speed of the airflow immediately downstream of the airflow-reducing region is typically lower than the speed of the airflow upstream of the airflow-reducing region.

The noise-reducing element may be configured to streamline, in use, the flow of air past the landing gear.

The airflow-reducing region may include a multiplicity of apertures through which, in use, air may pass. It is believed that providing a multiplicity of apertures of a given sum area provides a greater noise-reduction effect than a single round aperture of the same area could. For example, a single round aperture of a given area might result in an air flow that interacts with a part of the landing gear to cause turbulent flows downstream, whereas twenty apertures each having an area equal to a twentieth of the area of the single hole would result in the air flow being provided over a greater area, which it is thought reduces the possibility of unwanted noise being generated. The noise-reducing element preferably includes at least 10 apertures, more preferably includes more than 20 apertures and even more preferably has more than 50 apertures. There may be as few as three apertures. The apertures may be in the form of perforations. The apertures may be defined by a mesh. The provision of one or more appropriately positioned and shaped apertures in the noise-reducing element may have the effect of reducing the airflow that is deflected by the noise-reducing element.

The noise-reducing element may comprise a mesh. The mesh may be provided in front of the airflow-reducing region. Alternatively, or additionally, the mesh may form the airflow-reducing region. The airflow-reducing region may comprise the mesh. The noise-reducing element may comprise a skeleton structure, which supports and acts to maintain the profile of the mesh. The mesh may be so configured that it acts in use to deflect or divert airflows, whilst also allowing some air to pass through the mesh. In such a case, the mesh may form both the air-deflecting surface and the airflow-reducing region. The air-deflecting surface and the airflow-reducing region may be defined by a single mesh structure. The gaps in the mesh may be considered as being apertures through which, in use, air can pass. Such apertures may be arranged across substantially the entire surface area of the mesh.

The arrangement of the apertures across the air-deflecting surface may be non-uniform. It will of course be understood that the arrangement of the apertures as a whole may be non-uniform or irregular whilst at least one substantial portion of the air-deflecting surface has a regular or uniform arrangement of apertures. The non-uniformity of the apertures may merely be as a result of the apertures not being distributed evenly across the air-deflecting surface. For example, the air-deflecting surface may include a centre portion having a uniform arrangement of apertures and a peripheral portion having no apertures, such that the arrangement of the apertures across the air-deflecting surface as a whole is non-uniform. Furthermore, there may be one or more areas having no apertures, each area being disposed between regions having apertures. Such areas (having no apertures) may for example be needed in positions where the noise-reducing element has a structural function (for example there may be flanges or stiffeners on the rear surface of the noise-reducing element), where the provision of apertures would not be desirable.

The air-deflecting surface may include a first region encompassing no apertures and a second region encompassing at least ten apertures, the area covered by the first region having a minimum dimension that is at least as great as the maximum dimension of the area covered by the second region. The second region may for example be in or near the middle of the air-deflecting surface. The first region may for example be near to the periphery of the air-deflecting surface.

The airflow-reducing region may be disposed between two regions defined by the air-deflecting surface. The airflow-reducing region may be surrounded on all sides by the rest of the air-deflecting surface. The airflow-reducing region may thus not extend to the edge of the air-deflecting surface. Alternatively, the airflow-reducing region and the air-deflecting surface may be defined by the same thing. Thus, the air-deflecting surface may comprise the airflow-reducing region. Similarly, the airflow-reducing region may comprise the air-deflecting surface. For example, a mesh may act both as an airflow-reducing region and as an air-deflecting surface.

There may be more than one airflow-reducing region on the noise reducing element. There may for example be a plurality of discrete airflow-reducing regions. Such discrete airflow-reducing regions could of course be considered as being separate sub-regions of a single airflow-reducing region. Similarly, the air-deflecting surface may comprise separate discrete surfaces that together form a single, albeit with discontinuities, air-deflecting surface.

The or each aperture may be round in cross-section. Other shapes could of course be used, but round holes are easily machined. As mentioned above, the or each aperture may be defined by a part of a mesh.

The or each aperture may be formed such that the portion defining the part of the aperture on the surface that in use faces the airflow (i.e. the upstream surface) has substantially no sharp edges. Sharp edges might, under certain conditions, generate extra noise. That portion may have substantially no edges defined by surfaces meeting at angles of 90° or less. The or each aperture may for example be countersunk on the surface that in use faces the airflow (i.e. the upstream surface).

The passageway through the noise-reducing element defined by each aperture may flare out towards the surface that in use faces the airflow (i.e. the upstream surface). In such a case, it is preferred that the passageway also has a portion of substantially constant cross-sectional area.

The airflow-reducing region may have a volume of free space permitting the flow of air through the noise-reducing element and a volume of solid material defining the volume of free space. The airflow-reducing region may be considered as having a porosity. For example, the porosity may be defined as the percentage of free space to the total volume occupied by the airflow-reducing region. The porosity of the airflow-reducing region is preferably in the range from 10% to 60% and more preferably between 20% and 50%.

The sum of the cross-sectional area of all of the apertures (at their narrowest) in the airflow reducing region may be equal to a percentage (hereinafter the perforation percentage) in the range from 10% to 60% of the total area of the airflow-reducing region. Preferably, the average width of the air-deflecting surface between adjacent apertures is wider than the average minimum dimension of the apertures. More preferably, the perforation percentage is between 20% and 50%. The perforation percentage is in the range from 40% to 50% (inclusive). The perforation percentage may be in the range from 40% to 45% (inclusive). The perforation percentage may be in the range from 42% to 44% (inclusive). The perforation percentage may be in the range from 43% to 47% (inclusive). In an embodiment described below the perforation percentage is about 44%. In another embodiment the perforation percentage is about 45%.

The perforation percentage is preferably chosen so that, in use at normal speeds on approach when landing, the relative speed of the air immediately behind the airflow-reducing region is between 20% and 80% of the relative air speed in front of the airflow-reducing region. The perforations may be arranged such that the percentage reduction in air speed is between 25% and 75% and more preferably between 30% and 70%. In the embodiment described below, the percentage reduction is between 40% and 60%. The percentage reduction may be less than 50%.

Preferably, the properties of the airflow-reducing region (for example defined by the hole diameter and perforation percentage) are chosen, so that, at a typical landing approach speed, the air flowing through and behind the airflow-reducing region is not turbulent, or at least, is such that turbulence is low relative to the turbulence that would be caused downstream if the noise-reducing element did not include the airflow-reducing region.

The perforation percentage is preferably chosen such that, in use at normal speeds on approach when landing, the airflow-reducing region has a steady flow-resistance within the range 10 to 200 MKS Rayls ($N.s.m^{-3}$) and more preferably within the range of 20 to 100 MKS Rayls.

The airflow-reducing region may cover an area, which would, if the airflow-reducing region were replaced with an extension of the air-deflecting surface, cover at least one stagnation point or cover at least the majority of a stagnation line. The airflow-reducing region may be so shaped as to only cover one or more stagnation points/lines, preferably all the stagnation points/lines, and the or each region immediately surrounding the or each stagnation point/line. Alternatively, the area covered by the airflow-reducing region may be significantly greater than that required to cover the or each stagnation line/point. The coverage of the airflow-reducing region will of course depend not only on the shape and configuration of the noise-reducing element, but also on the positioning of the noise-reducing element in relation to the noise-generating parts of the landing gear/aircraft. For example, if the noise-reducing element is being used to shield a bogie undertray, control of the airflow downwards is not critical, whereas proper control of any airflows being deflected upwards will be important. Such a noise reducing element would benefit from an arrangement wherein the airflow-reducing region reduces the amount/speed of air deflected upwards.

The airflow in the vicinity of the stagnation point may under certain conditions be turbulent.

Of course, even with the provision of such one or more apertures, stagnation points may still occur. However, the presence of such apertures near any such stagnation point may allow some air to escape through the aperture thereby reducing the flow velocity of the deflected airflows, thus further reducing noise.

The or each aperture may be in the form of a gap, hole, passageway, opening or other means that allows air to flow through the noise-reducing element as opposed to being deflected by it. It will be understood that, whilst preferred, the or each aperture need not for example be bounded on all sides. For example, the apertures may be linked by elongate paths formed by other apertures. The or each aperture need not be regular in shape. Indeed, one aperture may be so shaped to form a multiplicity of sub apertures. The or each aperture may be defined by crossing wires, such as for example in a wire mesh.

The noise-reducing element is preferably so arranged that in use it shields at least a part of the landing gear. The noise-reducing element is preferably in the form of a fairing that covers at least a part of the landing gear, when the landing gear is in a position in which it is able to support part of the weight of the aircraft on the ground. Said part of the landing gear may for example be a part of the landing gear that has been identified as contributing to the generation of unwanted noise during landing. Said part of the landing gear may be in the region of a steering column of a nose gear, a tow-bar, the underneath of a bogie of a main landing gear, an articulated linkage, one or more rods, a brake actuator, a steering actuator, a door that in its closed position covers the aperture through which the landing gear passes when being deployed, and/or a dragstay.

There is also provided a noise-reducing element for use on an aircraft landing gear, the noise-reducing element including an air-deflecting surface and an airflow-reducing region through which, in use, air may pass, whereby the noise-reducing element is able in use to deflect air away from a noise-generating region of the landing gear, whilst allowing some air to pass through the element, thereby reducing the noise caused by the passing of the landing gear through the air. The reduction of noise may for example be effected by means of the reduction of the velocity of deflected airflows. The noise-reducing element may of course be so configured that it is suitable for use as the noise-reducing element of an aircraft landing gear according to any aspect of the above-described invention.

According to another aspect of the invention, there is also provided an aircraft noise-reduction apparatus for a landing gear, the apparatus comprising a skeleton structure, which supports and acts to maintain the profile of a noise-reducing layer, the noise-reducing layer, for example a mesh, having a multiplicity of apertures through which, in use, air can pass.

The provision of a separate skeleton structure for supporting a noise-reducing layer allows the functions of noise reduction, primarily provided by the noise-reducing layer, and of mechanical support for the noise-reducing layer, to be separated. This may in turn allow for a more efficient and/or more lightweight noise-reduction apparatus. For example, it may be possible by means of separating out the function of support from that of the means for reducing noise to use a relatively flexible and lightweight noise-reducing layer (for example in the form of a fine mesh) for noise reduction which would without the support provided by the skeleton support structure not be sufficiently strong to support its profile and shape when in flight.

The noise-reducing layer may have an average thickness of less than 5 mm.

The noise-reducing layer may comprise an air-deflecting surface. The noise-reducing layer may comprise an airflow-reducing region. The air-deflecting surface and/or the airflow-reducing region may be in a form similar to that described above in relation to other aspects of the present invention. For example, the apertures of the noise-reducing layer may be defined by a mesh.

The present invention also provides an aircraft landing gear (which may or may not form part of an aircraft) according to any aspect of the above-described invention. There is for example, provided an aircraft including an aircraft noise-reduction apparatus arranged to reduce noise, wherein the aircraft noise-reduction apparatus is in accordance with any aspect of the aircraft noise-reduction apparatus of the present invention described and claimed herein.

More than one noise-reducing means in accordance with the present invention (for example a noise-reducing element or a noise-reduction apparatus) may be provided on a single landing gear. Preferably, two or more noise-reducing means are provided. The or each noise-reducing means may be formed of separate component parts. The or each noise-reducing means may alternatively be unitary in construction. Each additional noise-reducing means may include any combination of the features described herein with reference to the noise-reduction apparatus and/or the noise-reducing element of the present invention. For example, two or more noise-reducing elements may be provided, each noise reducing-element including an air-deflecting surface and an airflow-reducing region through which, in use, air may pass. The air-deflecting surface may be a monolithic structure.

The present invention is of particular application on large aircraft, particularly passenger-carrying aircraft. For example, the landing gear is preferably of a size suitable for use on an aircraft designed to carry more than 50 passengers, and more preferably more than 100 passengers. Such aircraft generally have retractable landing gear assemblies and are of a size that generally makes effective noise-reduction or noise-avoidance more of a benefit. The landing gear may for example be movable from a stored (i.e. stowed) position to an operative (i.e. deployed) position.

The present invention also provides a method of reducing noise caused by landing gear on an aircraft including a step of manufacturing a landing gear according to any aspect of the above-described invention. Such a method may include a step of modifying an existing design in order to reduce noise caused by the landing gear. For example, such a method may include the steps of identifying a part of the landing that contributes to the noise generated by the landing gear when in flight, and then designing and manufacturing an aircraft noise-reduction apparatus for reducing the noise generated by said part, the aircraft noise-reduction apparatus comprising a skeleton structure, which supports and acts to maintain the profile of a noise-reducing layer, the noise-reducing layer having a multiplicity of apertures through which, in use, air can pass.

It will of course be appreciated that features described in relation to one aspect of the present invention may be incorporated into other aspects of the present invention. For example, the method of the invention may incorporate any of the features described with reference to the apparatus of the invention and vice versa. Also, the noise-reducing element of certain aspects of the present invention may include features described in relation to the noise-reducing layer of different aspects of the present invention and vice versa. For example, the apertures of the noise-reducing layer may have properties or characteristics the same as those of the apertures of the noise-reducing element.

DESCRIPTION OF THE DRAWINGS

Embodiments of the present invention will now be described by way of example with reference to the following schematic drawings of which.

DETAILED DESCRIPTION

Figure 1:
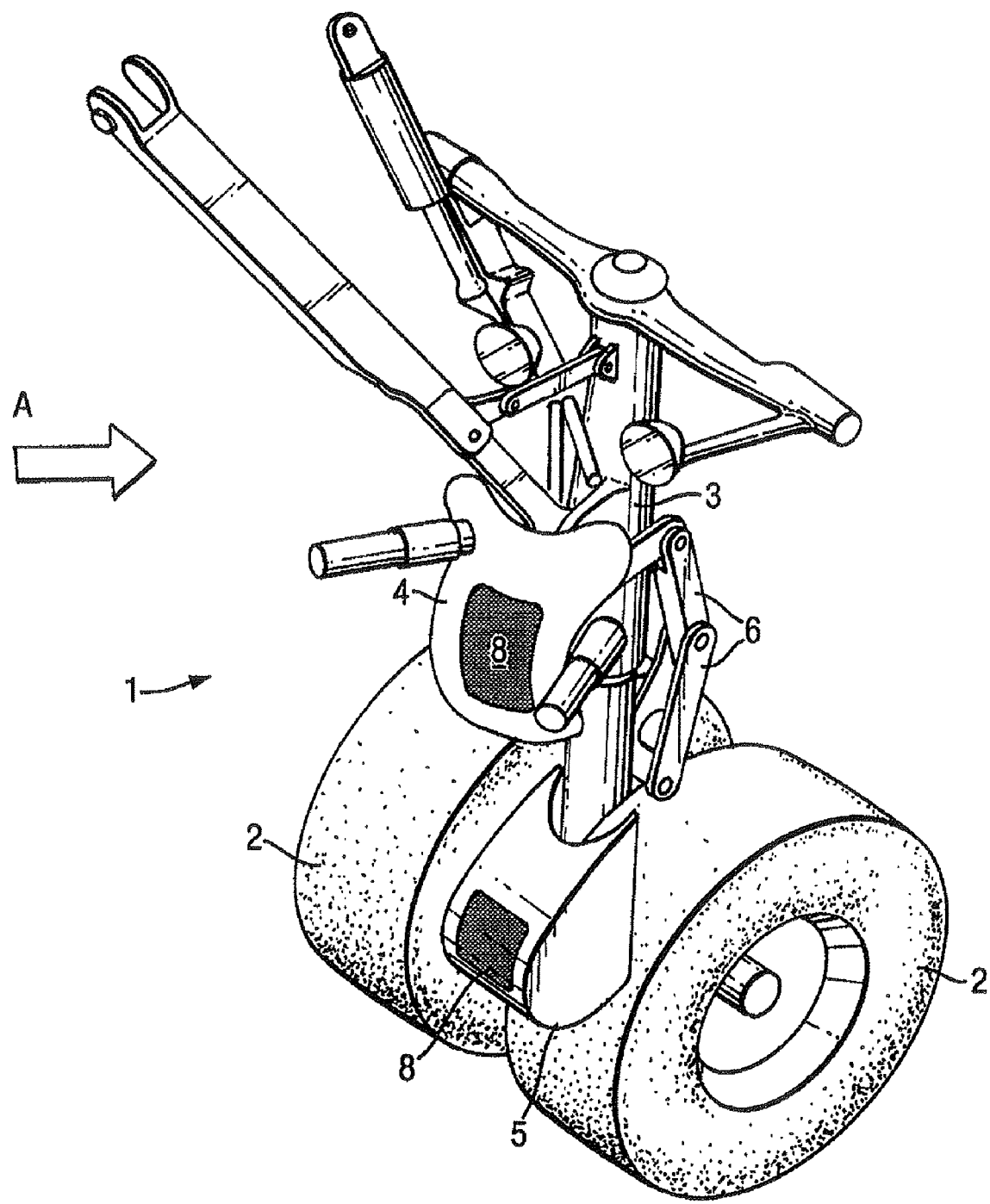
FIG. 1 shows in perspective view a nose landing gear with fairings.

FIG. 1 illustrates a first embodiment of the invention concerning a nose landing gear 1. The nose landing gear 1 includes wheels 2 a central support column 3 (or leg) and an upper fairing 4 and a lower fairing 5. The nose gear 1 is shown in its deployed position during landing of an aircraft (not shown in FIG. 1) to which the nose landing gear 1 is attached. The direction of flow of air relative to the nose gear is indicated by arrow A which points to the right in FIG. 1, since the nose gear and aircraft are moving to the left.

The upper fairing 4 is positioned over the central support column 3 in a position that shields parts 6 of the landing structure that are associated with the steering of the nose gear wheels 2. The parts 6 that are shielded by the fairing include steering actuators (comprising rods, linkages and the like) that would if not shielded generate significant noise. The upper fairing 4 is attached to the gear 1 via steering actuator mounting brackets. The upper fairing 4 has regions of both positive and negative curvature, and in the region at the front of the fairing, the fairing is saddle-shaped.

The lower fairing 5 is positioned over and therefore shields a tow-bar (hidden from view in FIG. 1) and jacking structure. The tow-bar, which is positioned between the fairing 5 and the central support member 3, may be used to tow the aircraft when the aircraft is on the ground and the jacking structure enables the aircraft to be jacked up by its nose gear to enable the nose wheels 2 to be serviced. Access to the tow bar and jacking structure is facilitated by means of a door (not shown in FIG. 1) in the lower fairing 5. The tow bar and jacking structure would also, if not shielded, generate significant noise. The lower fairing does not have any regions having a curvature resembling a saddle.

Each fairing 4, 5 has an aerodynamically-streamlined profile shaped so that the air approaching the fairing is deflected by the fairing away from the part of the landing gear that it shields. The fairings are generally convex in shape as viewed in the direction of arrow A and are made from sheet aluminium having a thickness of 1.6 mm.

Figure 2:
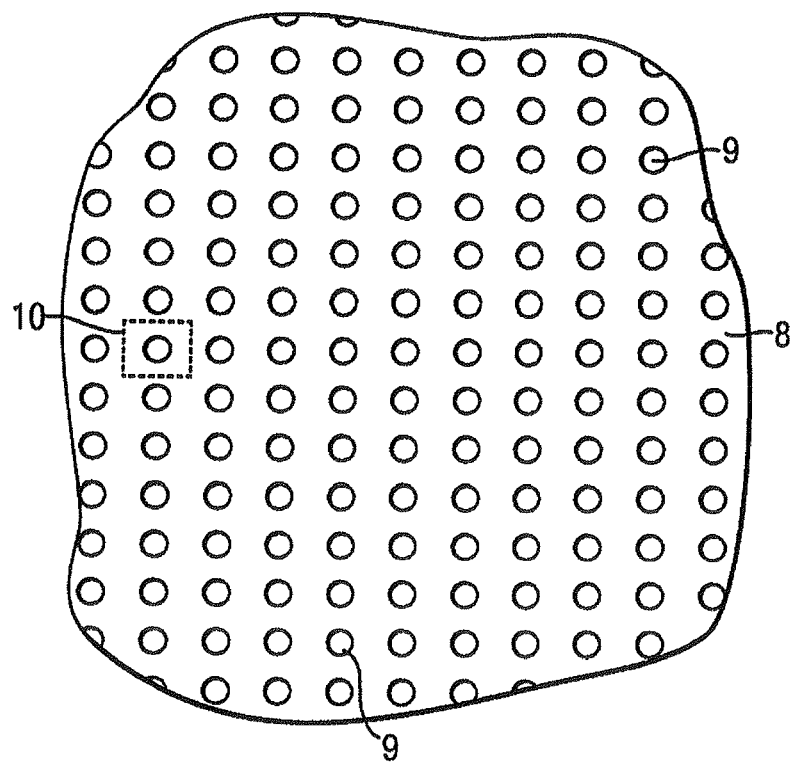
FIG. 2 shows a view of a region of a fairing of FIG. 1.

Each fairing also has a perforated region 8 indicated by the shaded regions in FIG. 1. The perforated region is shown schematically in plan view in FIG. 2. The region shown in FIG. 2 is a region of perforations formed in a flat plane (the plane being flat for the sake of clarity); it will of course be appreciated that most, if not all, of the perforated regions 8 on the fairings 4,5 are non-planar. The perforations are in the form of round holes formed in the fairing and are arranged in a square matrix of notional unit cells 10, each unit cell having a perforation in its centre. The cross-sectional area of a perforation varies along its length. The area decreases substantially constantly with length from the front face (in the direction of travel of the fairing) to a given depth (for example between ¼ and ⅓ of the length of the hole that defines the perforation—i.e. the thickness of the fairing). After that given depth the cross-sectional area of the perforation is substantially constant up to the back face. The perforations are thus in the form of countersunk holes, which are easily and readily formed in a blank fairing (or one or more sheets of aluminium to be made into a fairing) by drilling.

The diameter of each hole on the front face is 4.3 mm. The diameter reduces to 3.5 mm at a depth from the front surface of 0.4 mm (i.e. the hole flares out at an angle of 45°). The fact that the holes are countersunk on the front face means that there are no sharp edges presented to the incident airflow. If the holes were not countersunk, the sharp edges of the holes on the front face could cause oscillations in the airflow, thereby generating unwanted noise.

The notional unit cells 10 of the perforated region 8 have a width and height of 4.7 mm. The perforations each have a diameter of 3.5 mm at their narrowest. Thus adjacent perforations are separated by 1.2 mm (their centres being separated by 4.7 mm). The percentage of the area of the perforated region that is perforated (taking the minimum cross-sectional areas of the perforations) is 44%, the remaining 56% being formed of solid material (the same material as the rest of the fairing). The percentage of the area of the perforated region that is perforated (taking the maximum cross-sectional areas of the perforations) is 66%.

The perforated regions 8 are so shaped and positioned on the fairings that they do not extend all the way to the edge of the fairing but do cover the point, which if the fairing were not perforated in the perforated region, would form a stagnation point.

The term stagnation point is well known in the art. By way of example, and in relation to the present embodiment, the term may simply be defined as the point on the fairing at which it may be considered the air impacting against the fairing divides. Alternatively, as a very simple approximation, the stagnation point on a surface that is travelling in a given direction may be considered as being the point at which the normal to the surface is parallel to the direction of travel. Thus a given surface may have several stagnation points or the surface may have an infinite number of stagnation points, forming a stagnation line or even a stagnation area. Also, the position of the or each stagnation point will vary with the direction of relative motion between the surface and the fluid through which it moves.

The fairings are of course adequately vented so as not to prevent or hinder the flow of air through the perforations. In particular, the structure is so shaped, in relation to the rest of the aircraft downstream, that a given unit volume of air that flows through the perforations in the perforated region does not pass through an effective constriction downstream having an area smaller than the effective area of constriction of the perforated region through which the air passed. The fairing is in particular not a closed fairing.

On landing the aircraft, the speed of the air relative to the nose landing gear will for example be about 85-90 $ms^{-1}$ (i.e. roughly equal to the ground to air speed). During the approach, when the nose gear 1 has been deployed, the air flowing towards the fairings 4, 5 is partly divided and deflected away from the components of the landing gear that the fairings shield. However, some of the air passes (or "bleeds") through the fairings 4, 5 via the perforations 9 in the perforated regions 8. The air that passes through the fairings 4, 5 in this way is slowed down, by means of the friction between the fairing in the perforated region 8 and the air. The speed of the air relative to the fairing 4, 5 on the rear side of the fairing immediately behind the perforated regions 8 might for example be about 40% to 50% of the speed of the air relative to the fairing in front of the nose gear 1. The noise generated by the passing of this air over the components that are otherwise shielded by the fairings is less than the extra noise that would be generated by the airflows deflected by the fairing had the perforations not been provided in the fairing.

The countersinking of the perforations helps reduce the chances of resonance of the fairing at certain conditions which could cause extra unwanted noise at certain frequencies.

Figure 3:
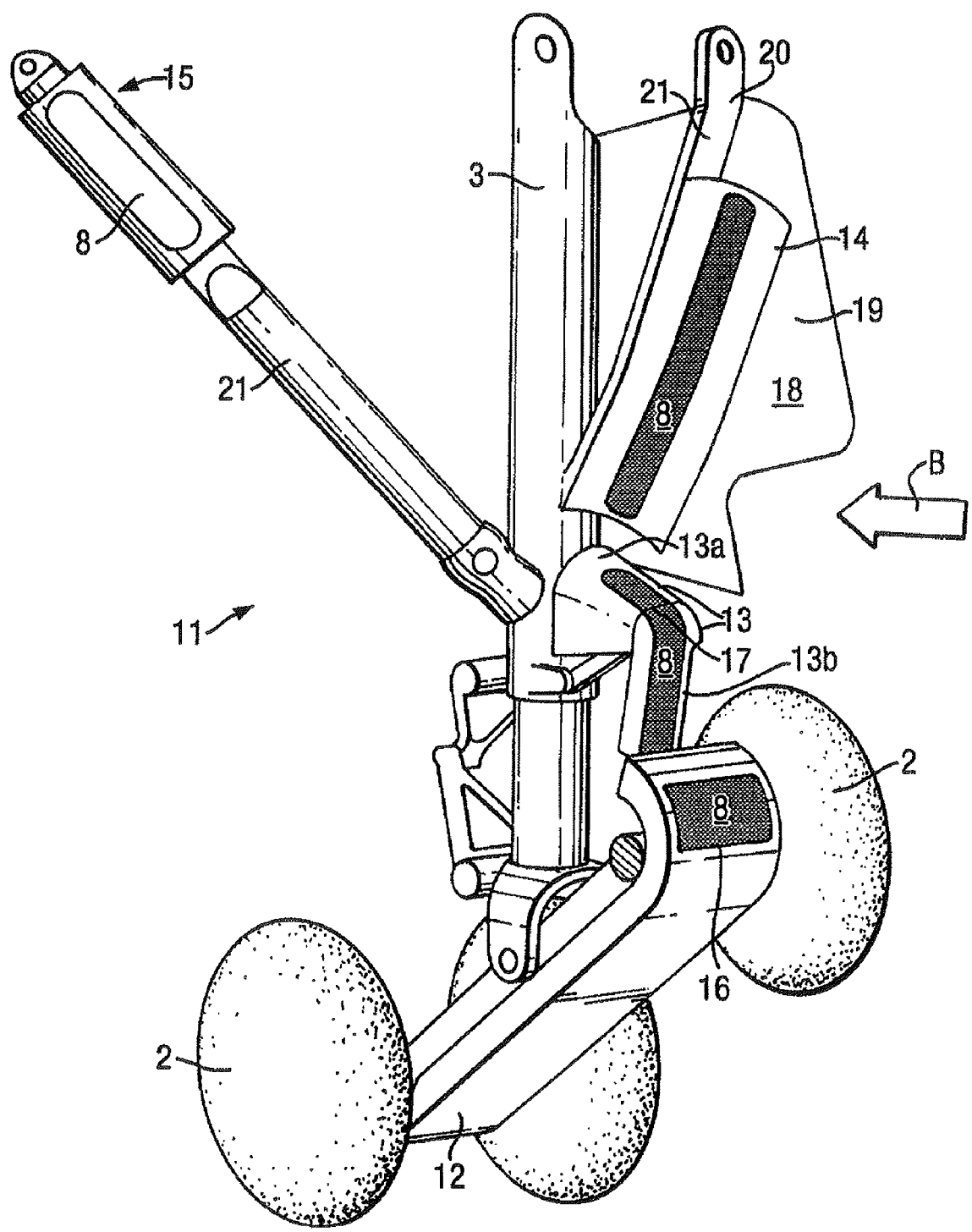
FIG. 3 shows in perspective view a main landing gear with fairings.

A second embodiment of the invention is shown in FIG. 3, which shows a main landing gear 11 including wheels 2 and a central support column 3 (or leg). The gear 11 includes several fairings 12, 13, 14, 15. The main gear 11 is shown in its deployed position during landing of an aircraft (not shown in FIG. 3) to which the main landing gear 11 is attached. The direction of flow of air relative to the landing gear is indicated by arrow B which points to the left in FIG. 3, since the main landing gear and aircraft are moving to the right.

The fairings illustrated in FIG. 3 include an undertray fairing 12, an articulation-link fairing 13, a door/dragstay-closure fairing 14 and an upper side-stay fairing 15. Each fairing includes, in a manner similar to that of the fairings shown in FIG. 1, a perforated region 8 which covers a stagnation point or part of a stagnation line. Thus the principles behind and improvements provided by the arrangement of the fairings shown in FIG. 3 and the perforated regions 8 thereon are the same as those described with reference to FIG. 1.

The undertray fairing 12 is a large single curvature cover that shields the underneath of the main landing gear bogie and brake rod area. The fairing 12 includes a forward-facing raised area 16 that has a streamlined shape which thus presents a smoother surface to the air than the landing gear would present without the fairing 12. The fairing 12 is clamped to both the bogie beam and the axles (not shown clearly in FIG. 3). The fairing 12 includes flush, removable doors (not shown for the sake of clarity in FIG. 3) that allow ready access to the undercarriage jacking structure and access to facilitate servicing of the wheels 2.

The articulation-link fairings 13 include an upper fairing 13a and a lower fairing 13b. The fairings 13a, 13b together cover and shield the gear-articulation-link mechanisms and jack. The fairings 13a, 13b are both clamped to their respective articulation links and are joined by an aerodynamic seal indicated by joint 17 in FIG. 3. Also the positioning of the lower-articulation-link fairing 13b is such that its lower end co-operates with the upper surface of the undertray fairing 12, when the bogie of the main landing gear is positioned in the trimmed position for landing (the position shown in FIG. 3).

The door/dragstay-closure fairing 14 shields the landing gear in the region between the dragstay 20 and the inner surface 18 of the main landing gear door 19. The fairing is shaped to provide an aerodynamically-smoother profile than would be provided if the forward flat surface 21 of the dragstay 20 were unfaired. The fairing 14 is also shaped such that it allows the side stay 21 to fold into the fairing 14 when the landing gear 11 is retracted and stowed.

The upper side-stay fairing 15 shields the otherwise flat surface of the upper part of the side stay 21 and again provides a more aerodynamically-acceptable surface than the bare sidestay 21. The fairing 15 also covers the gear actuation springs (not shown in FIG. 3).

Each fairing, in a manner similar to the first embodiment, is made from aluminium sheet material. The perforated regions 8 are similar to those of the perforated regions described with reference to the first embodiment, those regions being illustrated schematically by FIG. 2.

Figure 4:
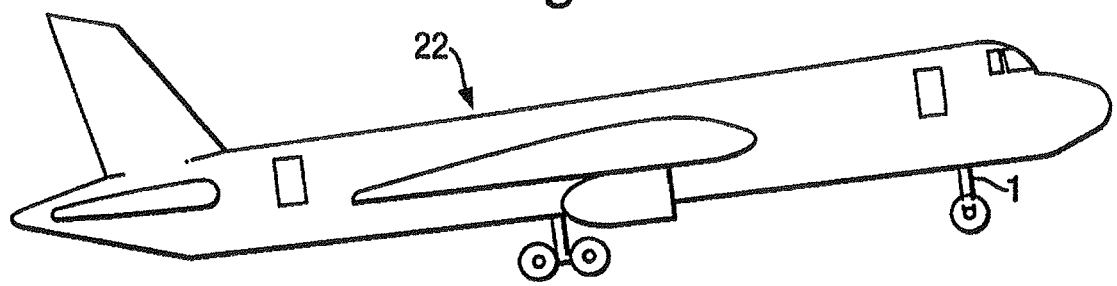
FIG. 4 shows an aircraft including both a nose landing gear as shown in FIG. 1 and two main landing gear as shown in FIG. 2.

FIG. 4 shows a third embodiment of the present invention relating to an aircraft 22. The aircraft 22 includes a nose landing gear 1 in accordance with the first embodiment and two sets of main landing gears 11 in accordance with the second embodiment of the invention (only one set of main landing gear 11 being shown in FIG. 4 for the sake of clarity). The aircraft 22 having landing gears that are provided with fairings having perforated regions as described above may result in the noise generated by the aircraft on its approach when landing being substantially reduced.

It will be readily apparent to the skilled person that various modifications may be made to the above-described embodiments without departing from the spirit of the invention.

The cross-sectional area of each perforation need not vary along its length through the fairing and could instead be substantially constant. Also, the perforation could include a portion that flares from a given depth to the rear face of the fairing, so that the perforations are in the form of holes that are countersunk on both faces of the fairing.

Other patterns of holes could be used. For example, the perforations may be arranged in a matrix, where each perforation if formed in the centre of a notional unit cell in the shape of a regular hexagon. An irregular arrangement of perforations may even be implemented.

The diameter, and spacing of the perforations (and consequently the percentage of the perforated region that is perforated) may be adjusted to suit a particular aircraft and/or to suit a chosen range of aircraft-to-ground speeds on landing.

For example, the optimum percentage of perforation is thought to be dependent on the relative speed of the fairing and the air. Different size and shape of aircraft, and different landing speeds, may therefore affect the ideal percentage of perforation. One method of choosing the perforation percentage is described below, purely by way of example only, with reference to FIGS. 5 to 8.

Figure 5:
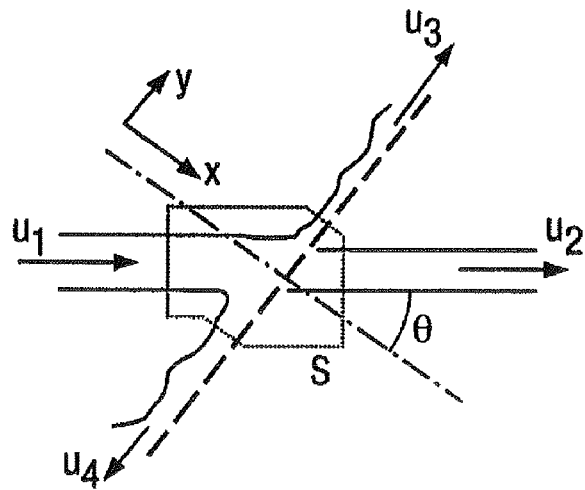
FIGS. 5 to 8 relate to a method of choosing the percentage perforation of a region of the fairing.
Figure 6:
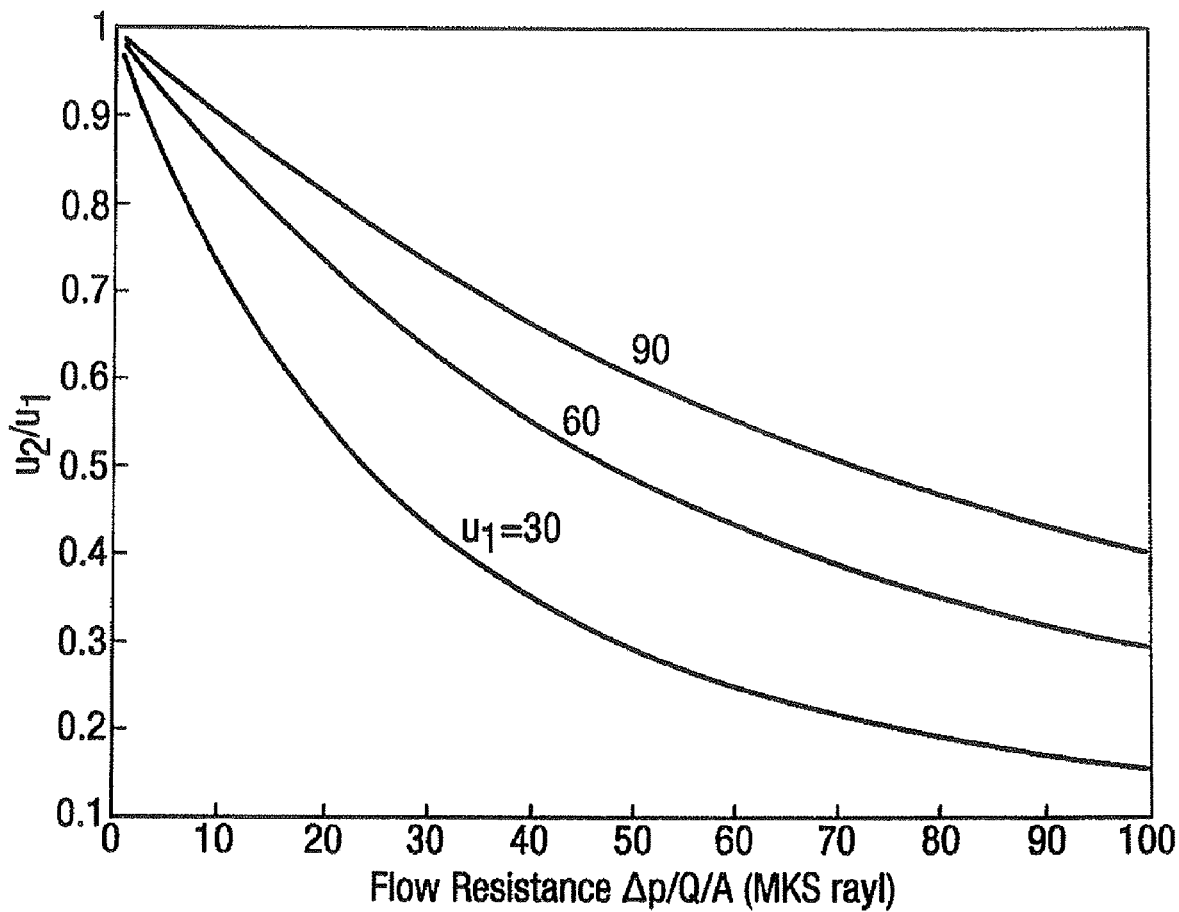
Figure 7:
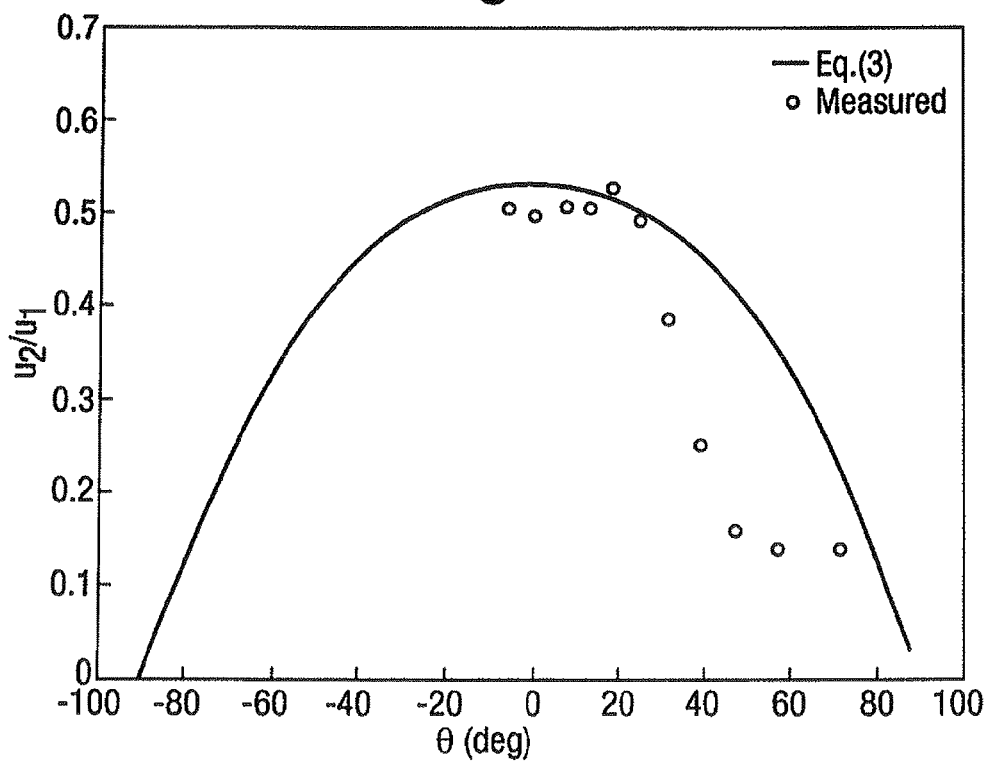
Figure 8:
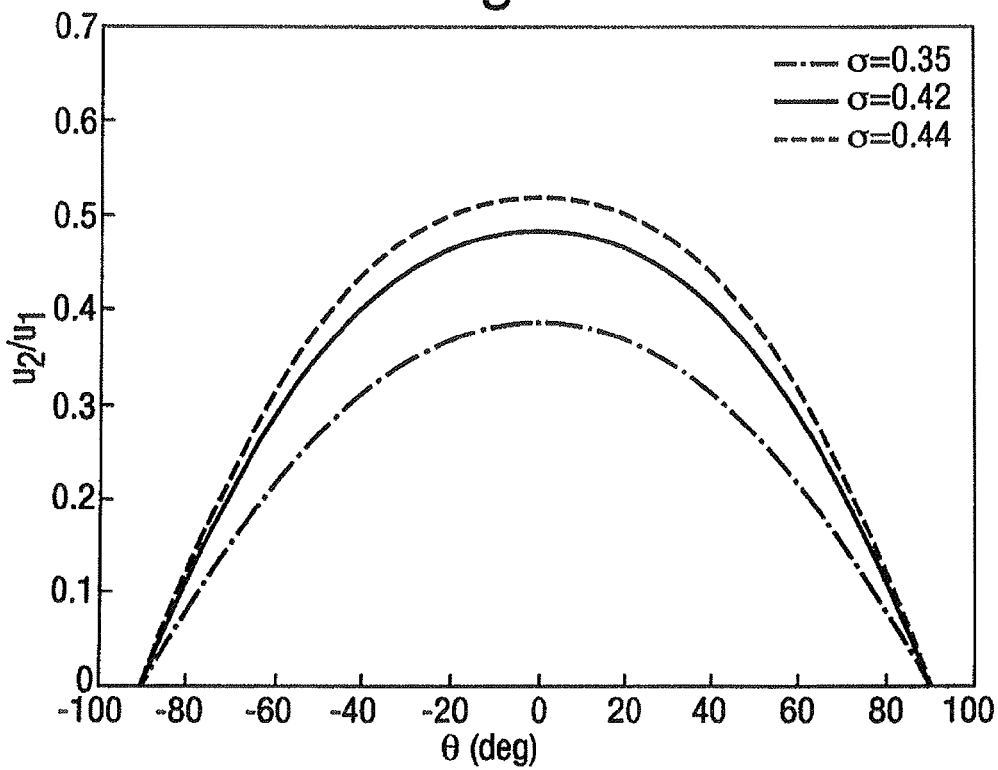
Figure 9:
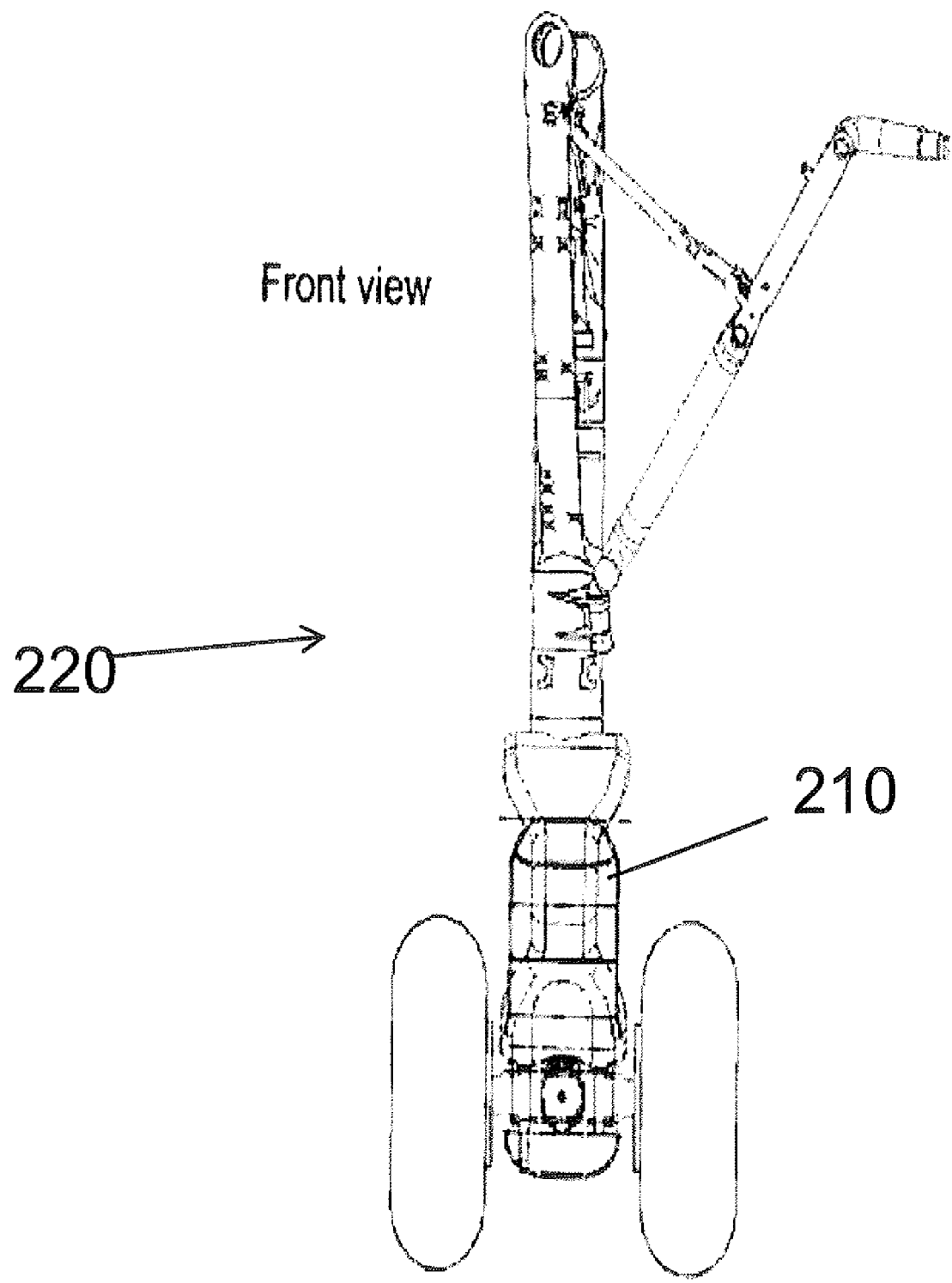
FIG. 9 is a front view of a deployed aircraft landing gear including a noise-reduction apparatus according to a fourth embodiment of the invention.
Figure 10:
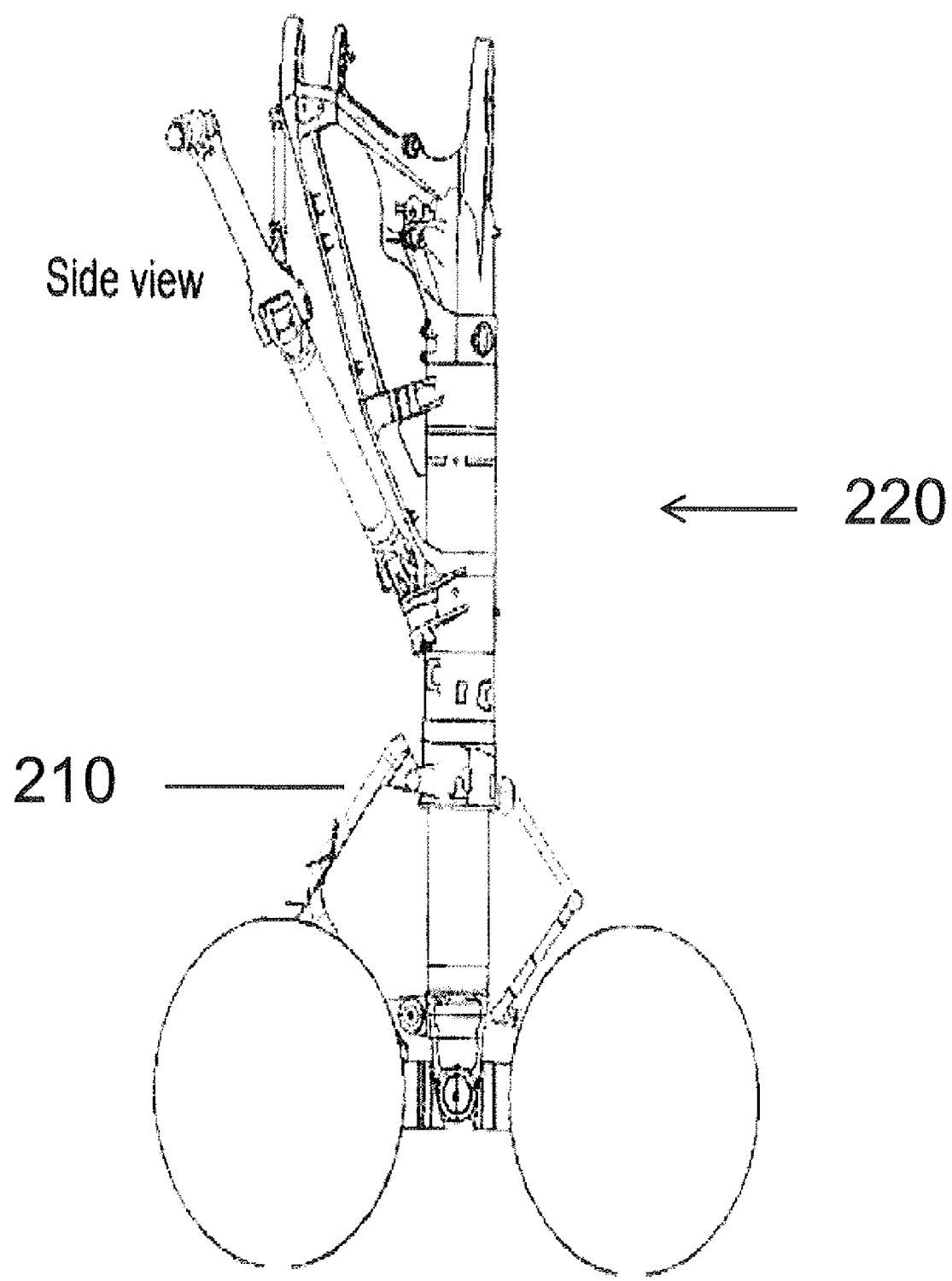
FIG. 10 is a side view of the landing gear of FIG. 9.
Figure 11:
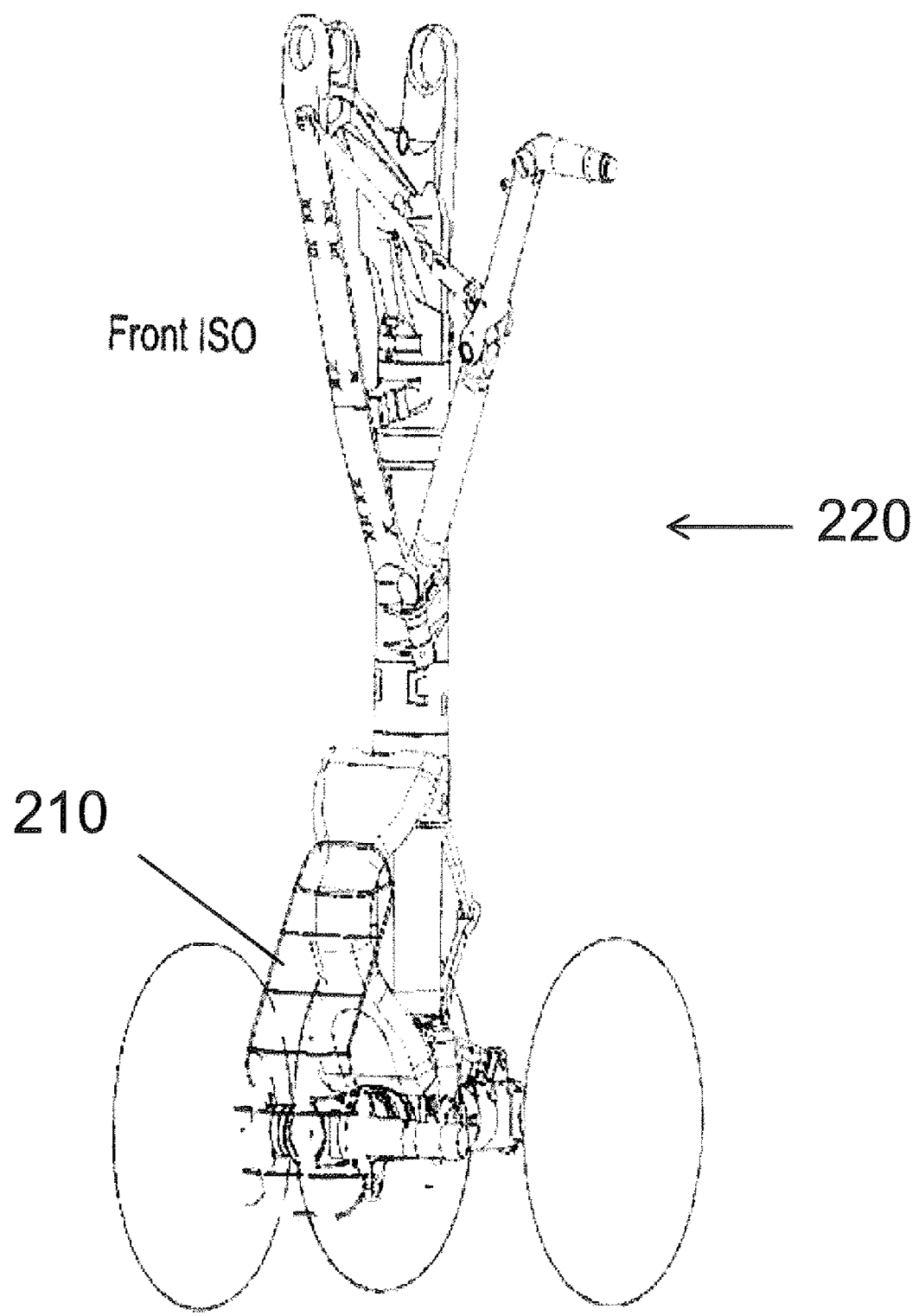
FIGS. 11 and 12 are perspective views from the front and rear, respectively, of the landing gear of FIG. 9.
Figure 12:
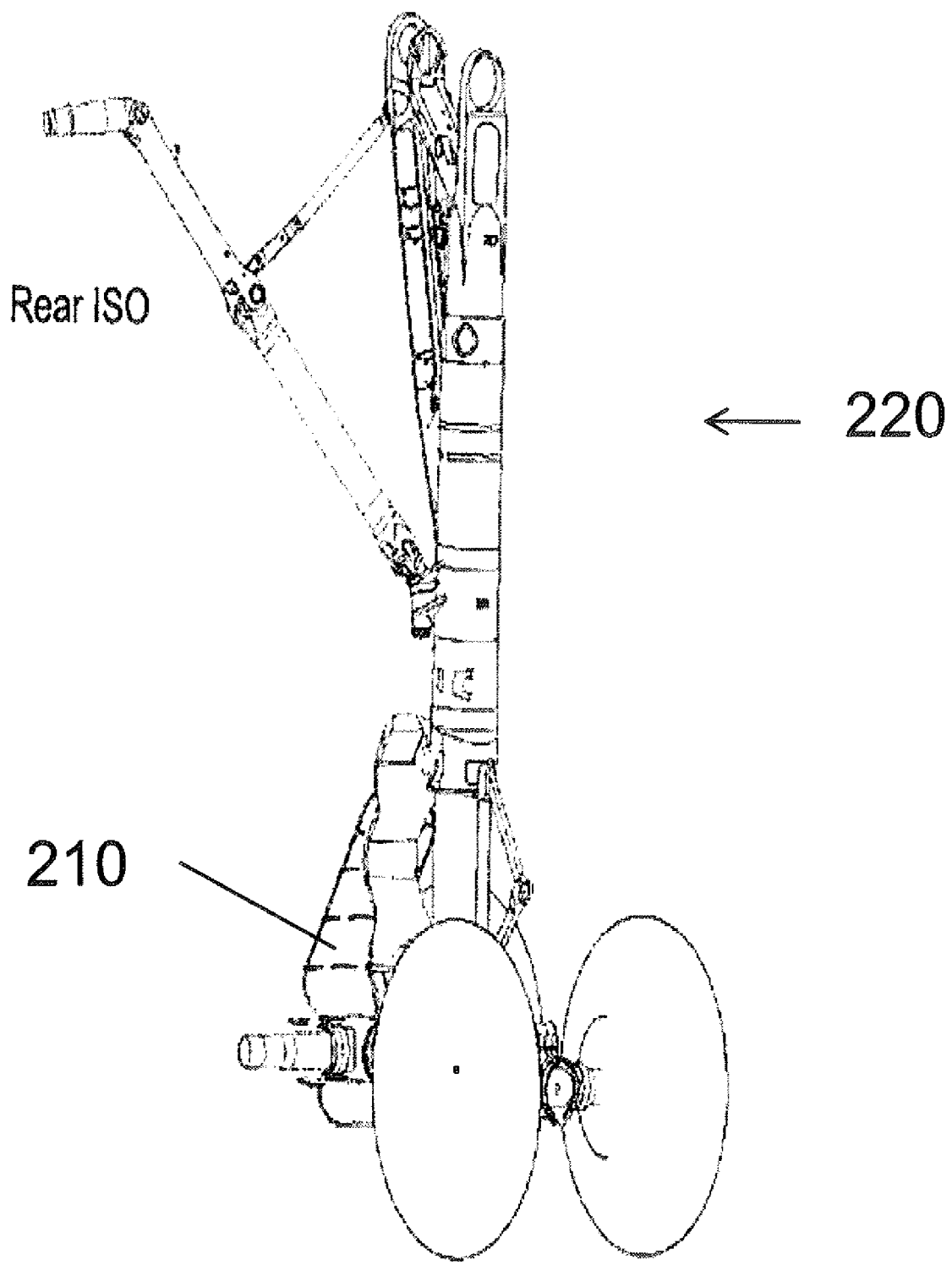

FIG. 5 shows a perforated plate in a flow stream of velocity $u_1$, FIG. 6 shows a graph of downstream to upstream velocity ratio as a function of DC flow resistance and upstream velocity, FIG. 7 shows a graph of u-component of the velocity distribution across scan plane for a half-cylinder perforated shell as measured in a wind tunnel test (only half of the measurements data points being shown since they are approximately symmetric), and FIG. 8 shows a graph of predicted flow distribution across scan plane for $u_1$=90 m/s, and 3 different open-area coefficients.

The publication Massey, B. S. *Mechanics of Fluids.* 5$^{th}$ ed. Van Nostrand Reinhold (UK), 1983 addresses the problem of a jet of fluid incident at an angle θ to a rigid surface, assuming inviscid, incompressible and irrotational flow. A similar approach is followed for the current problem but the surface is now perforated so that some fluid can flow through it. This situation is shown in FIG. 5.

The rate at which momentum enters the control volume enclosed by S in the direction perpendicular to the plate is $$\int \rho u_1 u_{1x} dA = \rho A u_1^2 \cos\theta$$

and the rate at which it leaves the volume in the x direction is $$\int \rho u_2 u_{2x} dA = \rho A u_2^2 \cos\theta$$

where $u_{1x} = u_1 \cos\theta$ is the velocity component in the x direction.

By Newton's second law, the excess in momentum rate in the x direction across the surface S is equal to a force $F_x$ on the perforate surface such that $$F_x = (p_2 - p_1)A = -\rho A \cos\theta (u_2^2 - u_1^2) \quad (1)$$

According to the publication Ingard, K. U. *Notebook #3 Notes On Sound Absorption Technology.* Ver94-02. Noise Control Foundation, NY, 1994 for a thin perforated surface the (velocity dependent) steady flow resistance $r_{DC}$ is given by:

$$r_{DC}(u_{or}) \equiv \frac{\Delta p}{u_{or}} \quad (2)$$

where ΔP is the pressure drop across the plate and $u_{or}$ is the mean flow velocity through the orifices. We assume here that for a perforated plate of open-area coefficient σ the velocity in the orifices $u_{or}$ can be approximated by $$u_{or} \approx \frac{u_2}{\sigma}$$

Multiplying eq. (1) by eq. (2) to give a quadratic equation in $u_2$, choosing the solution with the positive square root and rearranging gives $$\frac{u_2}{u_1}(r_{DC}, u_1, \theta) \approx \Omega(r_{DC}, u_1, \theta) \left( \sqrt{1 + \frac{1}{\Omega(r_{DC}, u_1, \theta)^2}} - 1 \right) \quad (3)$$

where $$\Omega(r_{DC}, u_1, \theta) = \frac{r_{DC}}{2u_1 \sigma \rho \cos\theta}.$$

FIG. 6 shows $u_2/u_1$ as a function of r for different incidence velocities and normal incidence (θ=0°).

The calculations made here are for a perforated plate, the perforations being arranged in a hexagonal matrix and having a pitch p=5.0 mm and orifice diameter $d_{or}$=3.5 mm. For the hole pattern of this material the porosity of the material is given by:

$$\sigma \approx \left(.95 \frac{d_{or}}{p}\right)^2 \approx 0.44.$$

The free stream velocity in the wind tunnel was $u_1$=60 m/s, and we approximate the velocity in the orifices by $$u_{or} = \frac{u_1}{\sigma} \approx 136 \text{ m/s}$$

giving a Reynolds number $$Re = \frac{u_{or} d_{or}}{\nu} \approx 3.1 \times 10^4$$

which, according to the publication Idelchick, I. E. *Handbook Of Hydraulic Resistance,* 2$^{nd}$ ed. Hemisphere Publishing Corp. 1986 (the disclosures of which hereby being incorporated by reference herein in its entirety) determines the flow across the perforate to be in a transitional region, between laminar and fully turbulent flow. Thus using diagram 8-5 of the Idelchick reference we calculate the resistance coefficient $$\zeta = \frac{\Delta p}{\frac{1}{2}\rho u_1^2} \approx \zeta_\phi \frac{1}{\sigma^2} + \bar{\varepsilon}_{0Re} \zeta_{1qu}$$

where $\zeta_\phi = f(Re, \sigma)$ accounts for 'laminar' viscous losses, $\bar{\varepsilon}_{0\,Re}$ is a factor Reynolds number dependant, and $\zeta_{1qu}$ is the resistance coefficient for fully turbulent flow (Re>10$^5$). The above are read from a graph or table to give $$\zeta \approx 0.02 \frac{1}{0.45^2} + 0.82 \times 6.45 \approx 5.4$$

In order to relate this resistance coefficient with the DC flow resistance defined above we can write $$\zeta = \frac{\Delta p}{\frac{1}{2}\rho u_1^2} \approx \frac{\Delta p}{\frac{1}{2}\rho (u_{or}\sigma)^2} = \frac{2 r_{DC}}{\rho u_{or}\sigma^2} \approx \frac{2 r_{DC}}{\rho u_2 \sigma}$$

and rearranging and assuming $u_2 \approx 0.5 u_1$ $$r_{DC} \approx \frac{1}{2} \zeta \rho u_2 \sigma \approx 43 \, rayls(MKS)$$

FIG. 6 confirms that for $u_1$=60 m/s and a DC flow resistance $r_{DC} \approx$43rayl(MKS), the predicted velocity $u_2$ downstream of the perforated plate should indeed be around half of $u_1$, in fact $u_2 \approx 0.54 u_1 \approx$32.4 m/s. If this was not the case, further guesses for $u_2$ would have to be made and the last steps iterated until agreement is achieved. FIG. 7 compares the prediction of eq. (3) as a function of angle θ with some data points read from the results of the measurements on the perforated plate. The agreement is good up to angle θ=±25°, after which the assumption of negligible mass flow tangential to the plate is no longer acceptable.

The former calculation is now reversed in order to (tentatively) specify the perforated plate for flight conditions. Because of the non-linear equations involved it is necessary to use an iterative procedure. Setting $$u_1 = 90 \text{ m/s}$$
$$\frac{u_2}{u_1} = 0.5$$
$$d_{or} = 3.5 \text{ mm}$$

then, from FIG. 6 read $r_{DC} \approx 72$ rayl, and an initial trial guess for $\sigma_0 = 0.35$ gives $$\zeta \approx \frac{2r_{DC}}{\rho u_2 \sigma} \approx 7.62$$

The Reynolds number is $$Re = \frac{\frac{90}{0.35} \times 3.5 \times 10^{-3}}{15.1 \times 10^{-6}} \approx 6 \times 10^4$$

and from diagram 8-5 of the Idelchick reference $$\left.\begin{array}{l}\overline{\varepsilon}_{0Re} \approx 0.91 \\ \zeta_\phi \approx 0.02\end{array}\right\} \zeta_{1qu} \approx \frac{\zeta - \frac{\zeta_\phi}{\sigma^2}}{\overline{\varepsilon}_{0Re}} \approx 8.2.$$

Finally, from diagram 8-1 of the Idelchick reference we can read the free-area coefficient corresponding to this resistance coefficient:

$$\zeta_{1qu} = 8.2 \Rightarrow \sigma \approx 0.39$$

which is not in agreement with our initial guess.
If we try as a second iteration for $\sigma_1 = 0.42$, the same calculation gives the correct value $$\zeta_{1qu} \approx 6.8 \Rightarrow \sigma \approx 0.42$$

FIG. 8 compares the predicted velocity distribution from eq. (3) for a perforate plate with $\sigma = 0.35$, $\sigma = 0.42$, and $\sigma = 0.44$ for the flight conditions specified.

Since the diameter of the orifices was fixed at 3.5 mm, an assuming a staggered arrangement of holes, the pitch required to give each porosity is $$\text{pitch} = p = \frac{0.95 \, d_{or}}{\sqrt{\sigma}} = \begin{cases} 5.62 \text{ mm} \Leftarrow \sigma = 0.35 \\ 5.13 \text{ mm} \Leftarrow \sigma = 0.42 \\ 5.01 \text{ mm} \Leftarrow \sigma = 0.44 \end{cases}$$

From FIG. 7 it is concluded that the model is in reasonable agreement with the data measured.

From FIG. 8 it is concluded that, assuming a hole size of 3.5 mm, the appropriate percentage open area for the flight condition is in the range 42%-44%. For the staggered hole arrangement of the original test sample (to be specified in detail) the appropriate hole pitch is thus 5.01 mm-5.13 mm. This specification is virtually identical to the material tested in wind tunnel tests The method described above with reference to FIGS. 5 to 8 is provided by way of example only to illustrate the issues that preferably need to be considered when choosing the arrangement and size of the perforations. It will of course be appreciated that other methods could be employed to specify the perforation pitch and diameter, and therefore the aerodynamic porosity. For example, wind tunnel tests and/or computer simulations could be utilised to obtain acceptable values by trial and error.

It is also thought that the provision of a mesh might provide even better results in terms of noise reduction. The mesh would be provided in front of the fairing and would, in particular, cover the region that is perforated. The gauge of the mesh would be much finer than the diameter of the perforations. For example, it is envisaged that a gap size in the mesh of 0.1 mm to 2 mm would be preferable. The mesh would further enhance the effect of the fairing of reducing the air velocity behind the fairing whilst letting some air through. The mesh could be arranged as a renewable item and as such would be removably mounted in relation to each fairing. A wire mesh would be suitable. The thickness of the wire or material forming the mesh should be as low (thin) as possible, but must of course be great enough for the mesh to be able to cope with the harsh environment (i.e. high air velocities) that the mesh would be subjected to on landing. The thickness could be between 0.01 mm to 1 mm. A thickness of less than 0.1 mm is preferable. The dimensions of the mesh may be similar to those of a conventional mosquito net. It is preferred that the mesh has a flow resistance, at approach speeds, of less than 200 MKS Rayls and preferably in the range of 10 to 100 MKS Rayls.

It is also within the scope of the present invention to provide a noise-reduction fairing where the perforated fairing is replaced by an adequately supported mesh fairing. Such mesh-based noise-reduction means are described in more detail below.

Figure 13:
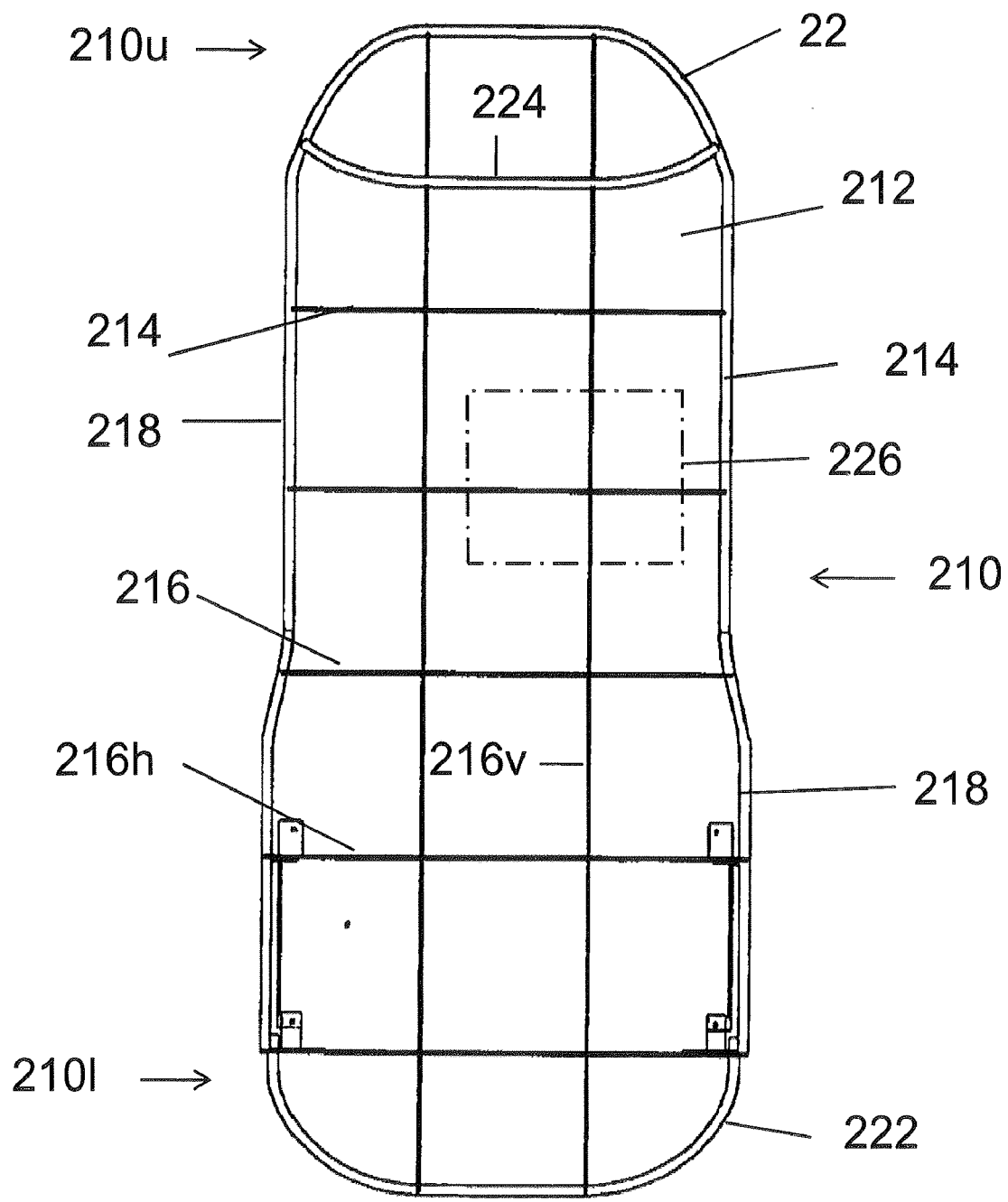
FIG. 13 is a front view of the noise-reduction apparatus according to the embodiment of the invention separate from the landing gear.
Figure 14:
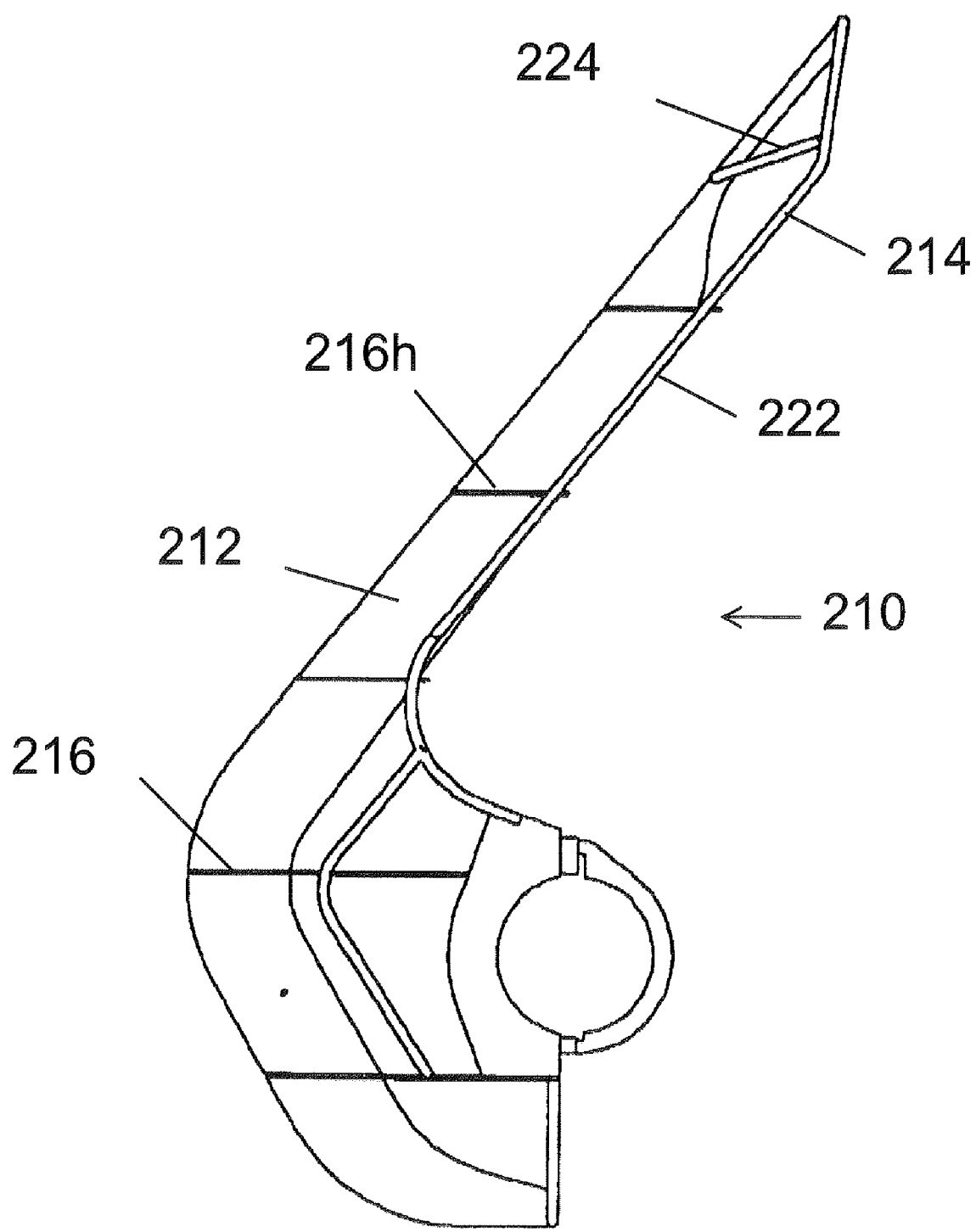
FIG. 14 is a side view of the noise-reduction apparatus of FIG. 13.
Figure 15:
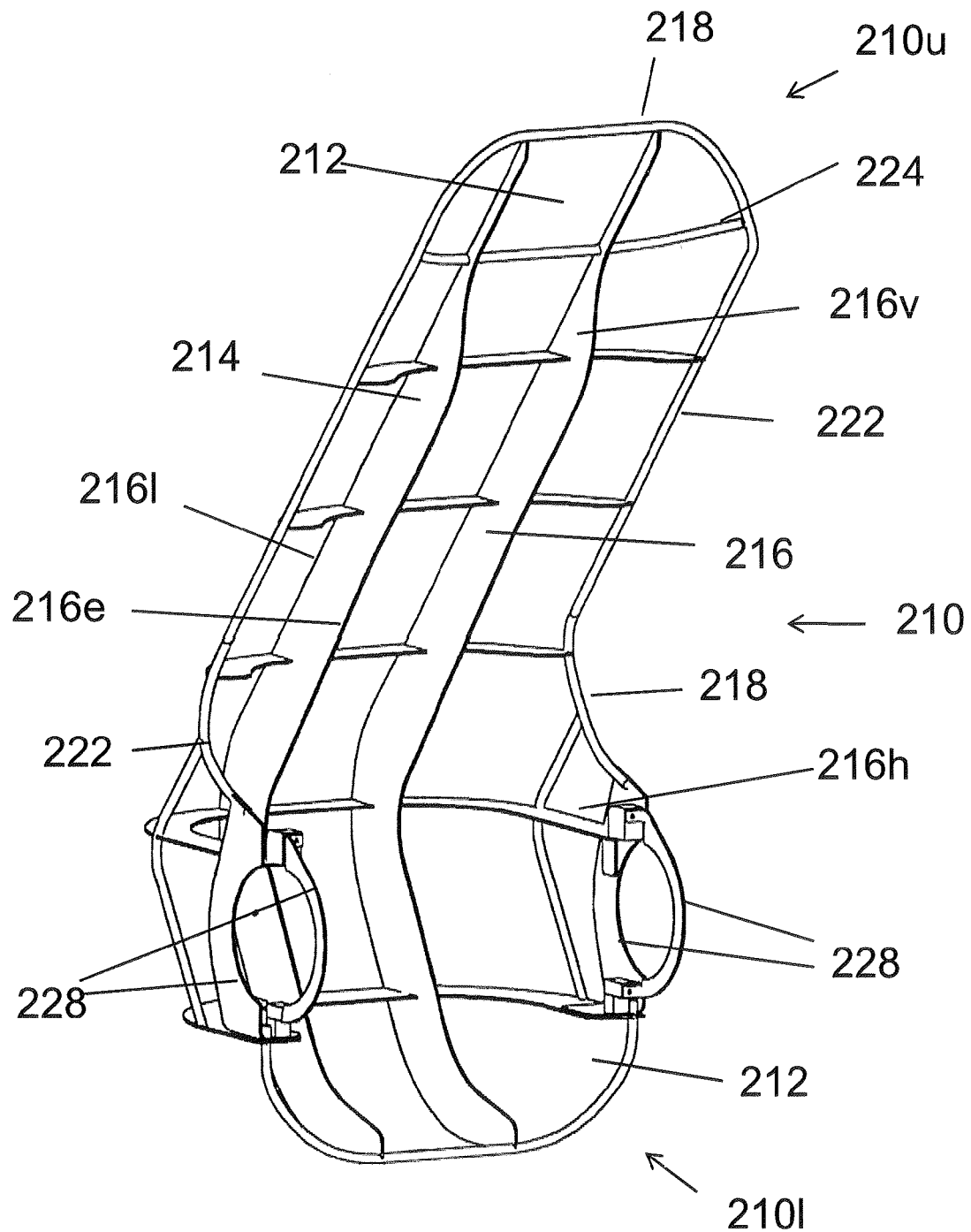
FIG. 15 is a rear perspective view of the noise-reduction apparatus of FIG. 13.

FIGS. 9 to 12 show an aircraft noise-reduction apparatus 210 mounted on a landing gear 220 according to a fourth embodiment of the present invention. The noise-reduction apparatus 210 is shown separately in FIGS. 13, 14 and 15. The landing gear 220 is movable from a stored position to an operative (or deployed) position. As can be seen from the FIGS., the apparatus comprises a skeleton structure 214, which in this fourth embodiment is defined by intersecting blades 216. The blades 216 defining the skeleton structure 214 act to support and maintain the profile of a noise-reducing layer, which in this fourth embodiment is provided by a mesh 212 (not separately illustrated for the sake of clarity in the drawings) having many apertures. In use, air flows through apertures in the mesh 212 and the mesh 212 acts to reduce the noise that would otherwise be generated by a part of the landing gear 220.

The noise-reducing layer may be relatively thin and flexible. For example, the mesh 212 if not mounted on the support structure 214 would be readily deformable by hand. The spacing of the blades 216 is such that the mesh 212 once mounted on the blades 216 is however sufficiently rigid that there is no significant movement of the mesh 212 relative to the blades 216. It will be understood that the mesh 212 is mounted on the upstream (leading) edges of the blades 216 that define the support structure 214. The mesh 212 closely follows the contours defined by the leading edges of the blades 216.

The mesh 212 has an average thickness of about 1 mm. In this context the average thickness of the noise-reducing layer can be calculated by measuring the average thickness of the solid material making up the mesh 212 in a direction normal to the surface of the mesh 212.

The mesh 212 of the present embodiment is a woven wire mesh 212. The thickness of the wire could be between 0.01 mm to 1 mm, and is in this embodiment about 1 mm. Other wire thicknesses could be used. The mesh 212 is a woven mesh, woven with plain weave, but other weaves would be suitable for example a Dutch weave. The mesh 212 could alternatively be formed from a sheet material with the apertures of the mesh 212 being stamped or otherwise machined out.

In this fourth embodiment the noise-reducing mesh 212 is made from uncoated stainless steel, but other metals are suitable, such as brass, titanium or aluminium or alloys thereof. The mesh may alternatively be made from plastic, such as Nylon, or from composite material. The wire may be coated with a protective coating, such as a powder coating or paint. The use of a coating may also enable the porosity of the mesh to be reduced, by increasing the effective thickness of the wire. The mesh 212 is pre-formed to ensure a close fit to the support structure 214.

The gap size in the mesh 212 at its widest is about 5 mm, but in some regions the gap size is as low as 1 mm. Other gap sizes might also provide noise-reduction benefits. Gap sizes in the range of 0.1 mm to 2 mm would be preferable. The gap may however be 10 mm or larger. The gap sizes may be in the range of 0.2 mm to 12.5 mm. The gap size need not be uniform across the mesh 212. It may for example be preferable to have a smaller gap size in certain regions having a low radius of curvature or where there is a change in shape. Having a non-uniform gap size in the mesh 212 may simplify manufacture by enabling a planar mesh 212 having a substantially uniform arrangement of apertures to be moulded into the desired shape.

The noise reducing layer has a perimeter 218 and it is preferred that the apertures in the layer extend to the perimeter 218 of the layer so that the layer is substantially entirely covered with apertures. In the present embodiment a thick wire 222 defines the majority of the perimeter 218. The perimeter wire 222 is thick relative to the dimensions of the mesh 212 and in this fourth embodiment has a thickness greater than that of the mesh 212 wire gauge. In this fourth embodiment, the mesh 212 is wrapped around the perimeter wire and soldered thereto. The perimeter wire is soldered to the blades 216 of the support structure 214 and thus the noise-reducing layer is not readily removable from the support structure 214 in this fourth embodiment. The noise-reduction apparatus 210 of the present embodiment may thus be considered as a single component. If the mesh 212 is damaged, it may therefore be the case that the whole noise-reduction apparatus 210 would be replaced, rather than being repaired. In this sense, the noise-reduction apparatus may be considered as being a disposable component. It may however be desirable for the noise-reducing layer to be mechanically mounted on the skeleton structure 214 so that the noise-reducing layer may thus be readily dismounted from the skeleton structure 214. Such an arrangement would allow the mesh 212 to be arranged as a renewable item. The mechanical means for mounting the noise-reducing layer (e.g. mesh 212) on the support structure 214 may take the form of a fixing strip, which releasably clamps at least part of the perimeter of the noise-reducing layer to the perimeter of the support structure 214. In such a case, the support structure 214 may comprise a perimeter wire and the noise-reducing layer may simply consist of a renewable sheet of mesh 212 material.

There are in this fourth embodiment no blades 216 at the periphery 218 of the mesh 212. There may be other regions of the noise-reduction apparatus 210 where the noise reducing layer is supported by thick wire as opposed to the blades 216 of the support structure 214. For example, the support structure 214, or the noise reducing layer, may include a thick wire instead of a blade 216 in regions where there is insufficient free space in which to mount a thin blade 216. In the present embodiment, the mesh 212 includes a cross support 224 in the form of a thick wire at the upper end of the noise-reduction apparatus 210 (best illustrated in FIGS. 13, 14 and 15). In the present embodiment, the perimeter wire 222 and the cross-support wire 224 both act to increase the rigidity of the mesh 212 at the regions of the thicker wires 222, 224, but the mesh 212 is still flexible and deformable in other regions to the extent that an extensive skeleton support structure 214 is required to maintain the shape and profile of the mesh 212 during flight conditions.

Other methods of forming the support structure 214 and noise-reducing layer together include, by way of example, machining or casting a substantially monolithic metal structure, curing or gluing a composite skeleton structure 214 to the noise-reducing layer, or riveting the mesh 212 to the support structure 214.

Each aperture is preferably formed such that the portion defining the part of the aperture on the surface that in use faces the airflow (i.e. the upstream surface) has substantially no sharp edges. Sharp edges might, under certain conditions, generate extra noise. The shape of each aperture is preferably such that the surfaces defining the aperture are relatively smooth. In the case of a woven mesh, the wire forming the mesh is preferably round in cross section. Also, the aperture surfaces may be further smoothed out by painting or otherwise coating the mesh.

The noise-reducing layer may have a volume of free space permitting the flow of air through the noise-reduction apparatus and a volume of solid material defining the volume of free space. The noise-reducing layer may be considered as having a porosity. For example, the porosity may be defined as the percentage of free space to the total volume (including such free space) occupied by the noise-reducing layer. The porosity of the airflow-reducing region is in this embodiment about 45%. Preferably, the average width of the noise-reducing layer between adjacent apertures is less than the average minimum dimension of the apertures.

The skeleton support structure 214 is preferably arranged such that it offers minimum air resistance to airflow whilst providing sufficient structural support to the noise reducing layer. Some or all of the apertures in the mesh 212 defining the noise reducing layer in this embodiment may during use become partially or fully blocked in certain conditions. For example, some of the apertures may get blocked with ice or dirt. The structure 214 needs to be strong enough to hold safely such a blocked mesh 212.

The skeleton structure 214 may include parts that directly support the noise-reducing layer in a position local to the apertures in the noise-reducing layer. The majority (and preferably more than 75%) of the region(s) of the noise-reducing layer that are directly supported by the skeleton structure are local to the apertures in the noise-reducing layer. The blades 216 of the skeleton structure 214 may for example directly support a meshed region.

The skeleton structure 214 is preferably more than 90% open in a first direction. Consider, for example, a small section of the skeleton structure 214, which is typical of the structure as a whole, such as the cell represented by the broken-lined box 226 shown in FIG. 13, which shows a view of the skeleton structure 214 in a given direction. The area covered by the blades 216 is about 7% of the area of the box.

The structure 214 is therefore about 93% open. In the present embodiment, the amount of solid material of the skeleton structure 214 "seen" by the airflow during use of the noise-reduction apparatus 210 is typically about 7%. The skeleton structure 214 may be considered as having a porosity in a similar way to that described above in relation to the noise-reducing layer. In this case, the porosity of the skeleton structure 214 is about 93%.

Each blade 216 of the support structure 214 has a leading edge 216*l* and a trailing edge 216*e*. The leading edges 216*l* of the blades 216 are arranged to support the noise-reducing layer. It may however be possible to have a noise-reduction arrangement in which the mesh 212 is mounted downstream of the support structure 214. The blades 216 are generally sheet-like in shape. Each blade 216 preferably has a surface that is generally aligned with a single direction. For example, the blades 216 may each be substantially planar. The blades 216 are generally aligned with the expected direction of airflow in the region of the blades 216. It is preferred that the blades 216 do not include flanges or other strengthening structures that might increase the air-resistance or cause turbulences in the airflow.

The blades 216 in the present invention include a first set of vertical blades 216*v* and a second set of horizontal blades 216 ("vertical" and "horizontal" referring to their orientation when the aircraft is in normal flight conditions and the landing gear 220 is fully deployed). The vertical blades 216*v* are generally parallel to each other. Similarly, the horizontal blades 216*h* are generally parallel to each other. The horizontal blades 216*h* include slots for accommodating correspondingly slotted regions of the vertical blades 216*v*. During manufacture of the skeleton structure 214, the blades 216 are slotted together and then soldered together. Alternatively, the skeleton structure 214 could be machined from a solid block of metal material.

The blades 216 may be considered as including first blade 216 portions (portions of the horizontal blades 216) extending in a first direction along the mesh 212 surface and second blade 216 portions (portions of the vertical blades 216) extending in a second direction along the mesh 212 surface, the first and second directions being transverse to each other. In this case, the first and second directions are substantially perpendicular. It will however be appreciated that first and second blade 216 portions may intersect at angles other than 90 degrees.

In an alternative embodiment (not illustrated), each blade is formed in a zig-zag shape. The blades are arranged side by side such that the zig-zag-shaped blades collectively form a quasi-cellular structure in the general form of a honeycomb pattern. In such an alternative embodiment, the shape of the blades may be similar to that of a sine-wave. Adjacent zig-zag-shaped blades may touch at various positions along their length or may alternatively be spaced apart. The blades may be shaped in other ways in which to form a cellular or quasi-cellular structure, that provides strength and rigidity to the support structure.

The skeleton support structure 214 itself may be considered as comprising a region having a plurality of apertures through which in use air can pass.

In the present embodiment, the blades 216 are made from stainless steel. The blades 216 could alternatively be made from other metals, such as brass, aluminium, titanium, alloys thereof, or other aerospace alloys, or could be made from composite material. Composite blades 216 made be glued together, or otherwise bonded together, to form the skeleton structure 214. It will be appreciated that the various metal parts of the apparatus may be joined or made by ways other than soldering parts together. The parts may be welded or attached by other means.

The noise-reduction apparatus 210 preferably has a perimeter 218 that extends from an upper end 210*u* of the noise-reduction apparatus 210 to a lower end 210*l* of the noise-reduction apparatus 210. The air noise-reduction apparatus 210 may therefore not be in a form that wraps round on itself. The noise reducing layer may be arranged such that it does not extend to any regions downstream in the direction of the airflow of a part of the skeleton structure 214. In certain embodiments, however, the air noise-reduction apparatus 210 may surround a noise-generating component. The air noise-reduction apparatus 210 may surround a plurality of noise-generating components.

The noise-reducing layer may act in use to deflect or divert airflows, whilst also allowing some air to pass through the noise-reducing layer. The apparatus may be considered as forming a fairing. The apparatus may shield and/or cover a part of the landing gear 220.

The noise-reduction apparatus 210 may be mounted on the landing gear 220 by mechanical means, such as a clamp mechanism securable by means of one or more nut and bolt fixings. The noise-reduction apparatus 210 is preferably removably mounted on the aircraft structure.

As can be seen from FIGS. 9 to 12, the noise-reduction apparatus 210 is so arranged that in use it shields the lower end of the landing gear 220 and in particular the front end of the bogie, and the lower end of the landing gear leg and therefore the torque links to the rear of the landing gear 220. The noise-reduction apparatus 210 may be arranged to reduce the noise caused by other components on the aircraft. For example, the component may be in the region of a centre steering column of a nose gear. The component may be a tow-bar. The component may be in the region of the underneath of a bogie of a main landing gear. The component may be an articulated linkage. The component may be one or more rods. The component may be a brake actuator. The component may be a steering actuator. The component may be a door that in its closed position covers the aperture through which the landing gear passes when being deployed. The component may be a wheel hub. The component may be a drag-stay.

The noise-reduction apparatus 210 may be manufactured in accordance with the description above in order to reduce the noise generated by a part of the landing gear identified as contributing to the noise generated by the landing gear when in flight. The step of identifying such a noise generating part may be conducted by standard techniques in the art, for example by means of computer modelling or by means of setting up a microphone array in a wind-tunnel test.

Figure 16:
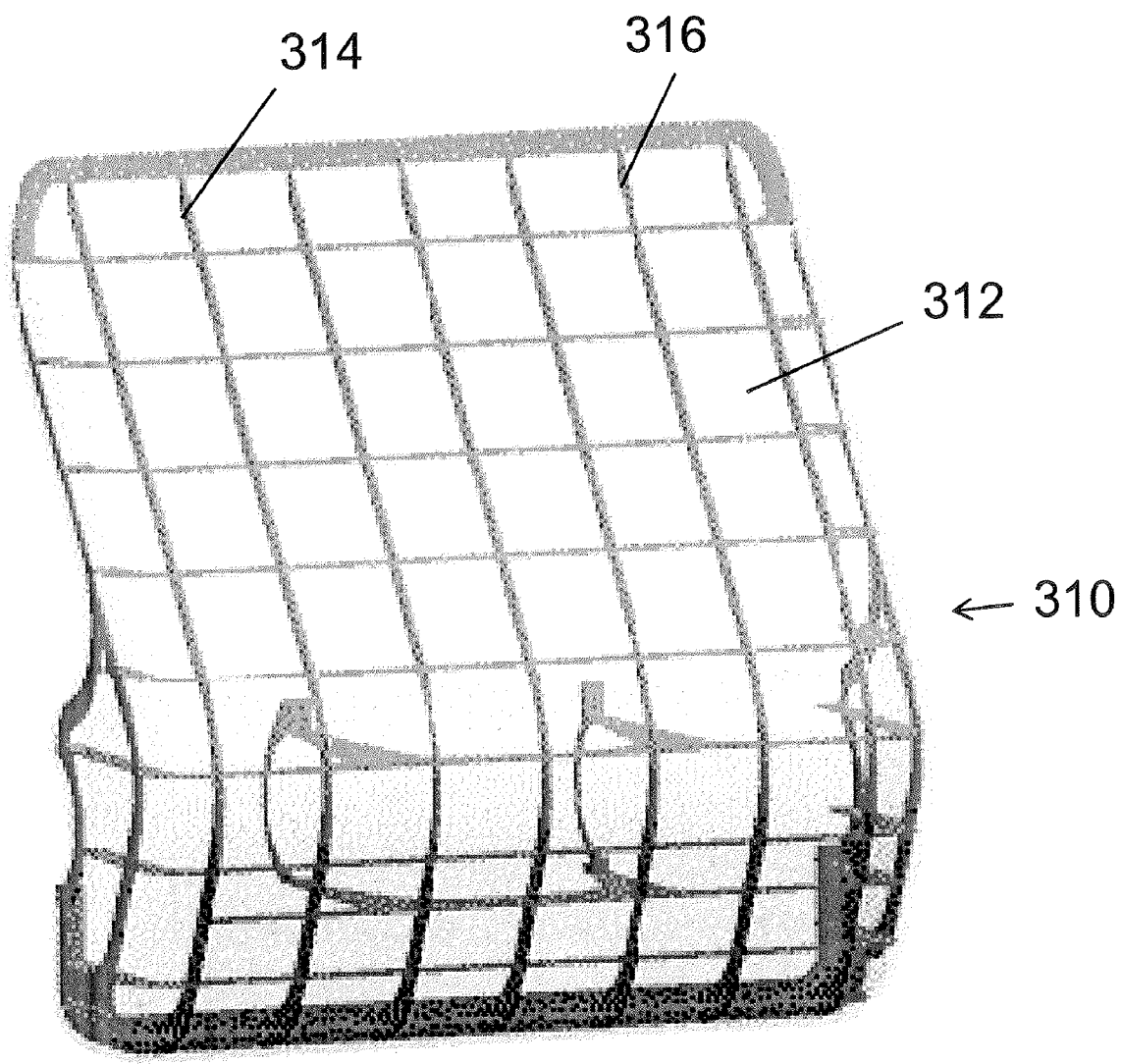
FIG. 16 is a front perspective view of a noise-reduction apparatus of a fifth embodiment.

FIG. 16 shows a fifth embodiment of the invention that is similar to the fourth embodiment with the principal difference that the noise-reduction apparatus 310 is in the form of a wider apparatus, so as to provide greater shielding of the noise generating component to be protected. The apparatus 310 is otherwise similar to that described above and for example comprises a skeleton structure 314 formed from an interlocking grid of blades 316 which support and define the shape of a mesh layer 312.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

As mentioned above, the principles of the present invention may be applied to reduce noise in respect of other components. In such cases the shape of the noise-reduction apparatus may be adapted to suit the shape and position of the component and structures local thereto.

Fewer or greater fairings may be provided and/or the function provided by two or more fairings may be provided by a single fairing if possible.

Adjacent perforations in the fairings of FIG. 1 could be connected by long and thin apertures such that a plurality of perforations could be considered as forming a single, albeit complexly-shaped, hole.

The fairing could be made from materials other than aluminium or alloys thereof. For example, the fairing could be made from carbon fibre or glass fibre composite materials or even plastic material.

The particular dimensions of the mesh may be varied. It is preferred that the mesh has a flow resistance, at approach speeds, of less than 200 MKS Rayls and preferably in the range of 10 to 100 MKS Rayls.

The invention is applicable to all aircraft where unwanted noise is an issue. As such, the present embodiment could be applied to aircraft having landing gear arrangements different from those described above with reference to the accompany drawings.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A noise-reducing element for use on an aircraft landing gear, the noise-reducing element including an air-deflecting surface and an airflow-reducing region through which, in use, air may pass, whereby the noise-reducing element is able in use to deflect air away from a noise-generating region of the landing gear, whilst allowing some air to pass through the element, thereby reducing the noise caused by the passing of the landing gear through the air.

2. A noise-reducing element according to claim 1, wherein the noise-reducing element includes a multiplicity of apertures.

3. A noise-reducing element according to claim 2, wherein the apertures are in the form of perforations.

4. A noise-reducing element according to claim 2, wherein the sum of the cross-sectional area of all of the apertures (at their narrowest) in the noise-reducing element is equal to a percentage in the range from 10% to 60% of the total area of the noise-reducing element.

5. A noise-reducing element according to claim 2, wherein the air-deflecting surface includes a first region encompassing no apertures and a second region encompassing at least ten apertures, the area covered by the first region having a minimum dimension that is at least as great as the maximum dimension of the area covered by the second region.

6. A noise-reducing element according to claim 5, wherein the first region is near to the periphery of the air-deflecting surface.

7. A noise-reducing element according to claim 1, wherein the airflow-reducing region is disposed between two regions defined by the air-deflecting surface.

8. A noise-reducing element according to claim 1, wherein the airflow-reducing region covers an area, which would, if the airflow-reducing region were replaced with an extension of the air-deflecting surface, cover at least one stagnation point or cover at least the majority of a stagnation line.

9. A noise-reducing element according to claim 1, wherein the noise-reducing element is disposed on an upstream side of the landing gear.

10. A noise-reducing element according to claim 1, wherein the noise-reducing element is in the form of a fairing that covers at least a part of the landing gear.

11. A noise-reducing element according to claim 1, wherein the noise-reducing element is configured to be mountable on an aircraft landing gear so that in use the noise-reducing element is able to deflect air away from a noise-generating region of the landing gear, whilst allowing some air to pass through the element, thereby enabling the noise caused by the passing of the landing gear through the air to be reduced.

12. A noise-reducing element according to claim 1, wherein the noise-reducing element comprises a mesh.

13. A noise-reducing element according to claim 12, wherein the airflow-reducing region is perforated and the mesh is provided in front of the perforated region.

14. A noise-reducing element according to claim 12, wherein the mesh forms the airflow-reducing region and the noise-reducing element comprises a skeleton structure, which supports and acts to maintain the profile of the mesh.

15. A noise-reducing element according to claim 14, wherein the mesh acts in use to deflect or divert airflows, whilst also allowing some air to pass through the mesh, whereby the mesh forms the air-deflecting surface and the airflow-reducing region.

16. A noise-reducing element according to claim 15, wherein the mesh has apertures through which, in use, air can pass, the apertures being arranged across substantially the entire surface area of the mesh.

17. A fairing that includes a region through which, in use, air may pass, the fairing being so arranged that in use some air is deflected away from a noise-generating region of the landing gear and some air passes through the fairing, thereby reducing the noise caused by the passing of the landing gear through the air.

18. A fairing according to claim 17, wherein the region in the fairing that permits air to flow therethrough is defined by a multiplicity of apertures in the fairing.

19. An aircraft noise-reduction apparatus for a landing gear, the apparatus comprising a skeleton structure, which supports and acts to maintain the profile of a noise-reducing layer, the noise-reducing layer having a multiplicity of apertures through which, in use, air can pass.

20. An aircraft landing gear including an aircraft noise-reduction apparatus arranged to reduce the noise generated by at least a part of the landing gear when in flight, wherein the aircraft noise-reduction apparatus is in accordance with claim 19.

21. An aircraft landing gear according to claim 20, wherein the landing gear is movable from a stored position to an operative position.

22. An aircraft landing gear including an aircraft noise-reducing element arranged to reduce the noise generated by at least a part of the landing gear when in flight, wherein the aircraft noise-reducing element is in accordance with claim 1.

23. An aircraft landing gear according to claim 22, wherein the landing gear is movable from a stored position to an operative position.

* * * * *